US008935296B2

(12) United States Patent
Taylor et al.

(10) Patent No.: US 8,935,296 B2
(45) Date of Patent: Jan. 13, 2015

(54) METHOD OF FACILITATING CONTACT BETWEEN MUTUALLY INTERESTED PEOPLE

(75) Inventors: Gregory Taylor, Huntington Beach, CA (US); Douglas Morgen, Huntington Beach, CA (US)

(73) Assignee: Taylor Morgen Corp., Huntington Beach, CA (US)

( * ) Notice: Subject to any disclaimer, the term of this patent is extended or adjusted under 35 U.S.C. 154(b) by 1348 days.

(21) Appl. No.: 12/000,596

(22) Filed: Dec. 14, 2007

(65) Prior Publication Data

US 2008/0147743 A1 Jun. 19, 2008

Related U.S. Application Data

(60) Provisional application No. 60/784,701, filed on Dec. 14, 2006.

(51) Int. Cl.
*G06F 17/30* (2006.01)
*H04L 12/58* (2006.01)
*G06Q 30/02* (2012.01)

(52) U.S. Cl.
CPC .............. *H04L 12/581* (2013.01); *G06Q 30/02* (2013.01); *H04L 51/04* (2013.01); *H04L 12/588* (2013.01)
USPC .......................................... 707/802; 707/804

(58) Field of Classification Search
USPC .................. 707/104.1, 802, 804; 709/218
See application file for complete search history.

(56) References Cited

U.S. PATENT DOCUMENTS

| | | | |
|---|---|---|---|
| 5,086,394 A * | 2/1992 | Shapira ............................ 705/1 |
| 5,950,200 A | 9/1999 | Sudai | |
| 5,963,951 A | 10/1999 | Collins | |
| 6,249,282 B1 | 6/2001 | Sutcliffe | |
| 6,366,962 B1 | 4/2002 | Teibel | |
| 6,549,768 B1 | 4/2003 | Fraccaroli | |
| 7,069,308 B2 * | 6/2006 | Abrams ......................... 709/218 |
| 7,117,254 B2 * | 10/2006 | Lunt et al. ..................... 709/218 |

OTHER PUBLICATIONS www.ecrush.com home page screenshot, Dec. 10, 2007.
www.secretadmirer.com home page screenshot, Oct. 29, 2007 (last available).
www.crushdate.com home page screenshot, Nov. 17, 2007.

* cited by examiner

*Primary Examiner* — Shahid Alam
(74) *Attorney, Agent, or Firm* — Symbus Law Group, LLC; Clifford D. Hyra

(57) ABSTRACT

An improved method of facilitating contact between mutually interested people takes advantage of existing contact lists such as those on social networking sites, instant messaging programs, or cell phones. A program is integrated into one or more of those technologies, allowing the user to characterize each contact on the basis of the user's level of interest in that contact as a date. The program keeps these rankings secret until two users indicate an interest in each other that surpasses a certain threshold. The users are then notified of the mutual interest. Ads and dating advice are sent along with the notification.

48 Claims, 1 Drawing Sheet

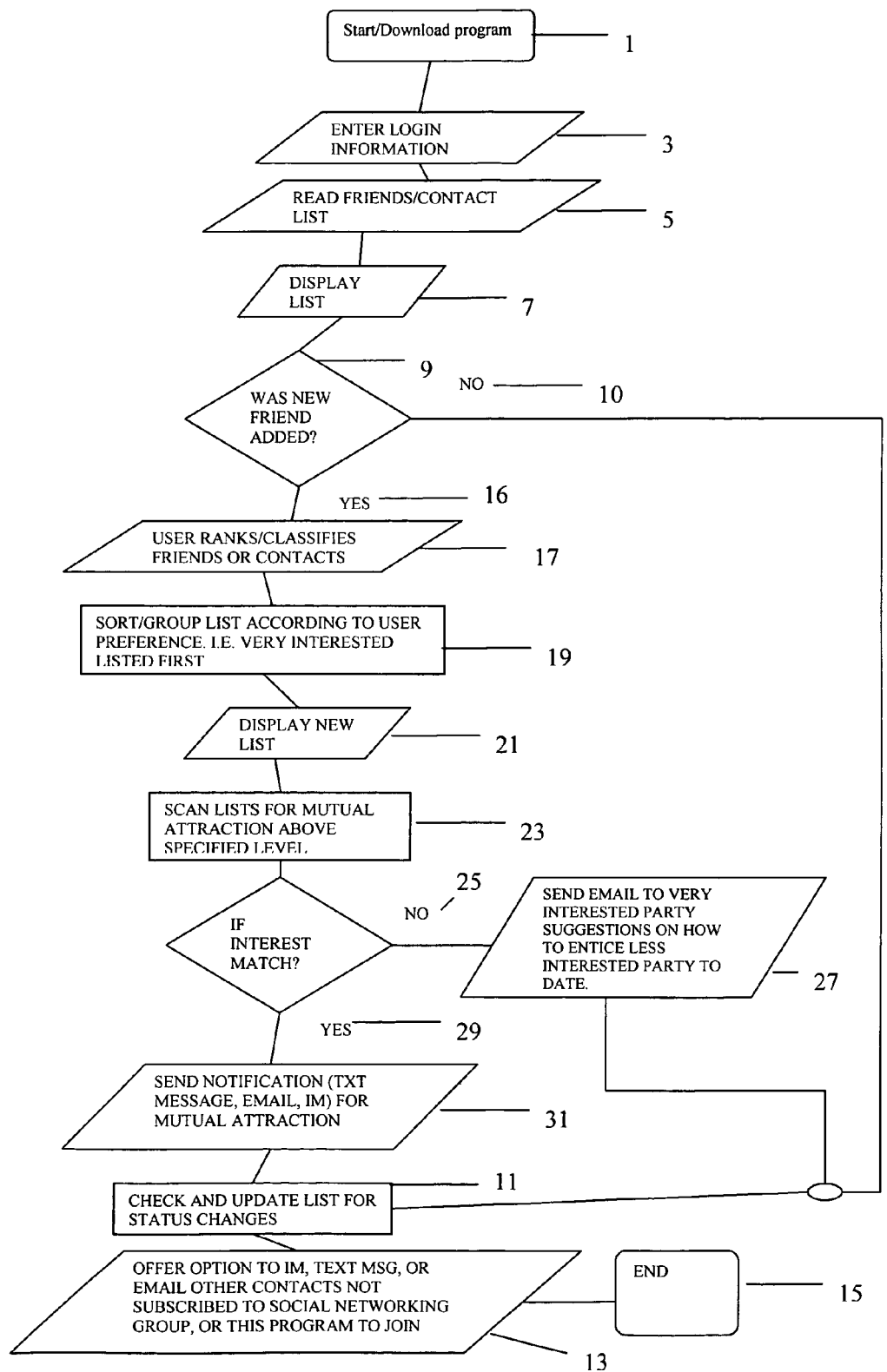

METHOD OF FACILITATING CONTACT BETWEEN MUTUALLY INTERESTED PEOPLE

This application claims the benefit of U.S. Provisional Application No. 60/874,701 filed Dec. 14, 2006, which is hereby incorporated by reference in its entirety.

TECHNICAL FIELD OF THE INVENTION

The present invention relates to the field of computer software, particularly online dating and social networking sites.

BACKGROUND OF THE INVENTION

The birth of the internet has revolutionized all manner of human communications. One form of human interaction that has adapted successfully to the internet is dating. Numerous websites have sprung up to support the interest in online dating services. Relationships are frequently forged in online chats and on message boards. Meeting potential mates over the internet offers the advantage of convenience and selection. Yet many of the problems that make it difficult to meet a romantic partner in traditional settings remain in online dating services.

One major obstacle to identifying potential romantic partners is fear of rejection. In a traditional setting or in an online dating service, one person has to make the first move. That person is opening themselves up to rejection by the party to whom advances are made. On an introduced a new "wink" option on its website. The "wink" allows members to indicate interest in another member without sending a personal message. Because interaction between the parties is limited, rejection is less of an issue. Nevertheless, this innovation does not solve the problem. "Wink"ing is still a unilateral advance and cannot determine a mutual interest.

Other websites have been created in an attempt to solve this problem. Sites such as secretadmirer.com, ecrush.com, and crushdate.com offer a service whereby members can determine whether their love interests share an attraction for them. After signing up, the member inputs the email addresses of his romantic interests. These people receive emails from the site informing them that someone is interested in them and asking them to become site members themselves. When they sign up, the new members enter the email addresses of their romantic interests. Whenever two people list each other as romantic interests, the site sends an email to both parties letting them know of the mutual attraction.

These websites do not effectively deal with the problem of shyness and fear of rejection. Users must take affirmative action and sign up at the site and the people they email must do so as well. More than likely the people who receive emails will believe they are spam and simply delete them. The member who caused the emails to be sent will never know whether those people are not interested in him or whether they simply deleted the email. Furthermore, it requires a person to know the email address of the person they are interested in. The method is also unlikely to result in matches between people with moderate interest in each other. People will not go to the effort of finding and entering the email address of everyone they are even somewhat attracted to. At most, they will enter the addresses of those they have a very strong interest in.

Another attempt at solving this problem can be found in Sutcliffe et al (U.S. Pat. No. 6,249,282). In Sutcliffe, a user enters a number of characteristic and criteria data describing his or herself and the kind of people he or she is interested in dating, respectively, into a common database. The Sutcliffe program then searches through the database to find users whose characteristic data satisfy the user's criteria data and whose criteria data is satisfied by the user's characteristic data. When it finds a match, the program notifies the user and provides contact information for the matches.

A similar method is used with a paging device in Shapira (U.S. Pat. No. 5,086,394). In Shapira, personal data such as traits and interests are entered into a device at a central location. The device searches for matching entries satisfying geographic and time constraints and pages users when a match is found. Fraccaroli (U.S. Pat. No. 6,549,768) does essentially the same thing but for cell phone users.

Sutcliffe, Shapiro, and Fraccaroli are imperfect solutions. They really only automate to some extent the process of finding potential romantic partners who are compatible. One user still must approach the other, and may still be rejected. Any set of data input is insufficient to encompass the many poorly understood factors that go into a mutual attraction or lack thereof. Additionally, the members are still strangers and cannot rely on the information provided by the other party. Many shy people will still be unwilling to join such a site or service.

Another attempt at resolving this difficulty is Sudai et al (U.S. Pat. No. 5,950,200). The Sudai method is much like that of the secretadmirer.com type of websites. Users input the identities of persons who they are attracted to or who share mutual interests. The inputs are stored in a database and searched repeatedly for matches, that is, for two people who feel the same way about each other. When a match is found, both users will be notified unless both agree that one of the parties should initiate (they have input this preference previously), in which case that party is informed before the other. This system suffers from the major flaw that both users must be members of this service. Like the secretadmirer.com websites, it will also result in few matches between people with only moderate attraction for one another because it requires each user to manually enter the names of people they are interested in.

Another obstacle that online dating sites do not resolve is the limited amount of information available about a potential date. Because the members are generally strangers, they have no way to verify the truthfulness of the other party's statements about themselves. This is an enormous problem in online dating. Many members are married but pass themselves off as single or portray themselves in a much more desirable light than is warranted. When the members meet in real life, they may be very disappointed by what they see, or may not learn of the other party's deception until well into the relationship, leading to heartbreak and pain. Members may even be subjected to physical violence when they meet for the first time.

One way to deal with this obstacle is to meet people that you already know or who know people who you also know. You then have a basis for determining the truthfulness of those peoples' representations of themselves. One efficient way of finding and communicating with people who share contacts with you is through a social networking site such as Friendster (Friendster.com, U.S. Pat. Nos. 7,069,308 and 7,117,254 B2). These sites allow you to know and view information about the friends and other contacts of your friends and contacts.

The sites thus provide users with an efficient means of identifying people they may have an interest in and whose information they can verify. However, no system exists for the full exploitation of the social network phenomenon for facilitating the meeting of people with a mutual interest. These sites do not have a process by which members can indicate an interest in other members and be automatically contacted when the interest is mutual.

Lists of contacts are also often stored in "buddy lists" (See U.S. Pat. No. 6,366,962) in online messaging software or in cell phones. Although Fraccaroli uses cell phones to notify users of matches, it does not take advantage of the contact lists in users' cell phones.

Needs exist for improved methods of facilitating contact between mutually interested parties.

SUMMARY OF THE INVENTION

The present invention is software that enables users of communication technologies such as cell phones, instant messaging, and social networking engines to date romantically people on their contact lists without the risk of rejection.

The invention will preferably be integrated (or done via a separate website with "friends" imported into an account) with a social networking website such as Friendster, MySpace, or Facebook, an instant messaging software such as AOL Instant Messenger or MSN Messenger, and/or a cell phone. If a separate website is used, alone or in combination with the integrated software, that website can collect and compile a user's contacts from each of these technologies, allowing the user to set ratings and software options and preferences from a central location. The users will rate their friends, buddies, or contacts on a scale of 1-10, or not interested, possibly interested, or very interested or some other such rating scheme. The ratings will be blind and neither user will expressly know the ratings their friends give them.

Once each user rates a counterpart a certain level, say "interested" or 6+ then they will both get notified. In a preferred embodiment of the invention, the notification is effected by an email stating that there may be a match with that friend. The notification may also take the form of an instant message, cell phone text message, or other similar communication, and may be effected by a different means for each party. Ads may be sold in the notification suggesting possible date locations or events to go to. The notification also will provide context-specific relationship advice. This advice may vary depending on the relative ratings of each party for one another, and could include suggestions of how best to contact and establish a baseline relationship with the other user.

In another embodiment, users have the ability to set a preference for one party to initiate. If both parties agree, only the initiating party will be contacted when a match occurs. The other party will be notified some time later.

In an alternative embodiment, the invention, at the user's option, may suggest other users the first user might be interested in who the first user does not know based on comparison of the first user's ratings with other users'. In another embodiment, users may "matchmake," suggesting potential matches to other users they know.

The present invention may also be used outside of a dating context, for example in forming business or any other type of relationships. The rating system is simply modified to reflect the changed type of interest.

In a new method of facilitating contact between mutually interested entities, a graphical interface is provided for a user to rate its level of interest in one or more respects in at least one other user from a pre-existing list of contacts, the user's ratings are not displayed to other users, and a pair of users is notified when each user's rating for the other has exceeded a threshold level. The graphical interface provided may be a modification of an existing graphical interface of a social networking site, instant messaging software, cell phone, or PDA. The existing graphical interface may be an existing graphical interface of two or more social networking sites, instant messaging software, or cell phones, in which case lists of contacts from each are combined so that a user can rate contacts from at least two of the two or more social networking sites, instant messaging software, cell phones, or PDAs from a single graphical interface. User settings or preferences may be set and adjusted for all the modified graphical interfaces from a central location. User settings or preferences may be set and adjusted for all the modified graphical interfaces from any one of the modified graphical interfaces.

In one embodiment, the pre-existing list of contacts is from a social networking site, instant messaging software, cell phone, or PDA, and the graphical interface is provided on a separate website. The pair of users further may be notified by sending an email, instant message, or cell phone text message. A graphical interface may be provided to allow the user to set the way in which it is notified. When the pair of users is notified, the pair of users may be sent suggestions for date or meeting locations, events to go to, general relationship or dating advice, or context-specific relationship advice. The suggestions or advice may include advertisements. The context-specific advice may vary depending on the relative ratings of each of the pair of users for the other. The context-specific advice may include suggestions of how to best contact and establish a baseline relationship with the other of the pair of users.

A graphical interface may be provided for users to set a preference for one party to initiate and the notification of the pair of users may be modified based on the preference of the pair of users. The notification may be modified by notifying one user of the pair before the other when both prefer one party to initiate. At least one user of the pair may be notified of the preference for one party to initiate of the other.

Other users that a first user may be interested in may be suggested to a first user based on a comparison of the first user's ratings with other users'. The other users suggested may not be on the first user's pre-existing list of contacts. The other users suggested may be users rated highly by users other than the first user who rate the users on the first user's pre-existing list of contacts similarly to the first user. The suggesting may be done only when the user has opted to receive such suggestions.

A graphical interface may be provided to allow the user to match-make by suggesting potential matches to other users they know. The user may be allowed to choose not to receive suggested potential matches. The user may be allowed to choose whether to receive suggested potential matches depending on characteristics of the suggested potential match. One member of a suggested potential match may be notified if the other party has opted not to receive the suggested potential match. An option may be provided for the other party to allow the notifying one party of a suggested potential match to include informing the one party of the reason the other party has opted not to receive the suggested potential match.

In one embodiment, one of the one or more respects is a non-romantic respect. The graphical interface for a user to rate its level of interest in one or more respects in at least one other user may be provided in part by providing different access points and contact lists for the user to rate its level of interest in romantic and non-romantic respects. A single access point and contact list may be used for rating interest in romantic and non-romantic respects.

A graphical interface may be provided that allows a user to import contacts from an instant messaging software, social networking site, PDA, or cell phone, and a comprehensive list of contacts for the user to rate may be displayed.

When the graphical interface provided is a modification of an existing graphical interface of a social networking site, instant messaging software, cell phone, or PDA, a graphical interface may be provided that allows the user to invite contacts who are not yet users of the social networking site, instant messaging software, cell phone, or PDA with the modified graphical interface to join the social networking site, instant messaging software, cell phone, or PDA with the modified graphical interface. Rating information may be stored on a social networking site or in an instant messaging software or instant messaging software server. If the graphical interface provided is a modification of an existing graphical interface of a cell phone or PDA, the rating information may be stored on an online server.

As part of the notification of a pair of users when each user's rating for the other has exceeded a threshold level, each contact the user has rated above the threshold level may be checked to see if that contact has also rated the user above that threshold level whenever a user rates a new contact or changes an existing rating. To notify the pair of users, a single notification may be sent as soon as the pair's ratings exceed the threshold level, and another notification may not be sent unless the ratings change such that one of the pair's ratings does not exceed the threshold level, and subsequently the pair's ratings change again such that each rating exceeds the threshold level. An indicator may be provided to indicate for the user each contact on a pre-existing list of contacts for which that contact's rating of the user and the user's rating of that contact each exceed the threshold level.

A graphical interface may be provided that allows the user to set a number of preferences regarding how contact lists and ratings are displayed and accessed. In the embodiment where the existing graphical interface may be an existing graphical interface of two or more social networking sites, instant messaging software, or cell phones, a single graphical interface outside of the social networking sites, instant messaging software, cell phones, or PDAs with modified graphical interfaces may be provided that the user can use to rate contacts from at least two of the two or more social networking sites, instant messaging software, cell phones, or PDAs. The single graphical interface outside of the social networking sites, instant messaging software, cell phones, or PDAs with modified graphical interfaces may be a downloadable program or website. In that case, a central database of contact, rating, and preference information may be maintained with the downloadable program or website.

The graphical interface may be provided, the user's ratings not displayed to other users, and a pair of users notified using an existing website and software infrastructure, making additional storage or servers or maintenance of a separate website are not necessary. A graphical interface may be provided allowing the threshold level to be modified by the user. The threshold level may be allowed to be modified upwards but not downwards. A graphical interface may be provided allowing a desired threshold level to be set by the user and setting the threshold level to the highest desired threshold level of the pair of users.

An option may be provided to the user to receive relationship advice when the user rates another user highly but the other user does not rate the user above the threshold level, when the user rates another user more highly than the other user rates the user and the other user does rate the user above the threshold level, or whenever a pair of users including the user is notified. The user may be informed when another user who the user has rated does not have a rating for the user. An option may be provided to the user to allow another user to be informed when the user does not have a rating for the other user, and otherwise the other user is not informed.

The pre-existing list of contacts may be read, the list displayed, whether a new contact was added to the contact list is checked, if so a graphical notice provided for the user to rate the new contact, the list sorted according to rating, the sorted list displayed, the list scanned for ratings exceeding the threshold level, and whether contacts rated above the threshold level have rated the user above the threshold level is checked.

When the invention is integrated into a networking site, instant messaging software, or cell phone or PDA, the method makes use of the existing software of the networking site, instant messaging software, or cell phone or PDA. The method is implemented by programs using the existing software infrastructure, thus minimizing the programming expertise required for implementation and making the integration a relatively simple task. For example, Facebook has a public software platform for application development. The Appendix contains the source code for a simple example implementation of the method as a Facebook application making use of that software.

In any integration, implementation of the method typically requires new graphics for allowing the user to rate and view ratings for its contacts and procedures for storing and checking the rating information. Procedures for sending notifications and storing contact lists are typically existing features of whatever the method is being integrated into and can be easily adapted to the purpose of this method.

These and further and other objects and features of the invention are apparent in the disclosure, which includes the above and ongoing written specification, with the drawings.

BRIEF DESCRIPTION OF THE DRAWINGS

FIG. 1 is a diagram showing the operation of one embodiment of the invention.

DETAILED DESCRIPTION OF THE PREFERRED EMBODIMENTS

FIG. 1 is a diagram showing the operation of one embodiment of the invention. A user first initiates the program 1 and is prompted to enter his login information 3. The program automatically reads the user's friends/contact list(s) 5 and displays it 7. The program then checks to see if any new friends have been added to the list since the last time the program was run 9. If no friends have been added 10, the user can check and update the list for status or ranking changes 11. The program offers an option 13 to instant message, text message, or email other contacts not subscribed to a social networking group or to this program to join before the user terminates the program 15.

If a friend/contact has been added 16, the user can then rank or classify the new friends 17. The contact list is then sorted according to user preference 19 and the modified list is now displayed 21. The list is then scanned for mutual interest above a specified level 23. If no mutual interest is found 25, an email is sent to the more interested party giving advice on how to entice less interested parties to date 27. If a mutual interest is found 29, the program sends a notification of the match to the users 31. The user can then check and update the list for status or ranking changes 11 and the program offers an option 13 to instant message, text message, or email other contacts not subscribed to a social networking group or to this program to join before the user terminates the program 15.

In a preferred embodiment, the present invention is a program integrated into one or more social networking sites, instant messaging software, or cell phone/PDA software. Because of this, the user does not have to download or sign up for anything. Once the integration is complete and initiated every user of the site or software will immediately have the option of using the present invention.

When a user loads or logs into the site or software, they will find the display has changed slightly. Next to the name of each contact in their "friends list" or "buddy list" will be an icon the user can click on in order to rate or characterize that contact by the user's level of interest in that contact as a romantic partner.

Because social networking sites, instant messaging software, and cell phones are so popular and because the program will be displayed prominently, high levels of participation are expected. This aspect is critical. In order for any matching system based on mutual attraction to be effective in locating dates, many people who know each other must participate.

There will also be an option within the site or software for the user to import additional contacts from any other instant messaging software or social networking sites in which the user participates, or from the user's cell phone. The user can then view a comprehensive list of all of these contacts and rate them and set options for the program from this central location within the user's social networking site, instant messaging software, or cell phone. If the user is a member of more than one site or software into which the program is integrated, the user will be exposed to the program whenever the user uses either site or software. The user will be able to manage his contact list and program options from each point. An option within the program allows the user to invite contacts who are not yet a member of an integrated site or software to join.

Whenever a user rates or characterizes a new contact or changes an existing rating, the program checks each contact that the user has rated above a certain threshold interest level to see if that contact has also rated the user above that threshold level. Rating information is stored by the site or messaging software just like other information about the user, e.g. name, location, etc. However, rating information is not visible to other people who access the user's page on the social networking site or "profile" on a messaging site. Only someone who is logged in as the user can view the user's ratings. If the user is accessing the program from a cell phone, the ratings are stored not on the cell phone, but on a server online. This allows the program to compare the users' ratings for matches even when their phones are off or otherwise inaccessible.

Because the program checks for matches whenever a user makes a new rating or modifies an old one, a match will always be detected as soon as it occurs. The program then notifies the users that a match has occurred. This notification will be sent by email, instant message, or cell phone text message, according to the preference set by each user. The notification will inform each user that a match has occurred, but will not reveal the other user's actual rating. The notification will also contain advertisements suggesting date locations and events.

After a match has been initially detected and the parties notified, the program will not send another notification for the same match unless the match lapses (one user lowers their rating of the other below the threshold level) and then is reestablished. Optionally, an indicator, such as an icon of some kind, may be displayed on the list beside each user for which a match presently exists. The indicator helps to prevent a situation in which neither user received or viewed the notification for some reason and therefore is unaware that a match has occurred.

Within the program interface in the social networking site or software, there will be many preferences that can be set by the user. These preferences allow the user to customize how the contact lists and ratings are displayed and accessed, how notifications will be received, etc.

The user will also be able to access the user's combined contact list and ratings from outside any of the sites or software the program is integrated into. The user can instead access the program through a downloadable program or a website that is just for the program itself. In this way, users will be able to access the program even when logging into an integrated site or software is undesirable, for example for privacy reasons, or when an integrated site of software is experiencing technical difficulties. This aspect of the program also allows it to be used by people who are not members of the integrated sites or software, who may download or sign up for the program directly instead.

This downloadable program or website maintains a central database of the contact, rating, and preferences information. Having a centralized database of the information makes it easier to use with more than one site or software. Every time the user makes a change to the information from an integrated site or software, those changes are uploaded to the central database. Each site or software can check its data against the centralized database each time it loads, automatically making changes to its data that the user initiated from a different access point (site or software).

In an alternative embodiment, the program functions without the use of a centralized database and access point. In this way, the program entirely piggybacks on existing site and software infrastructure. Additional storage and servers are not necessary, nor is maintenance of a separate website.

In another embodiment, the user has the option of modifying the threshold interest level above which matches are detected. The user may modify this level upwards, but not downwards. This prevents users from being flooded with notifications regarding low interest contacts.

In an alternative embodiment, the user has the option of setting an "initiation" preference. Some people believe that, for an inter-gender relationship, the male should always initiate contact. Users will therefore have the option of setting a preference for male initiation or female initiation. In one embodiment, the user who is preferred to initiate will receive notification some time period before the other user, allowing the first user to initiate contact. If the users have conflicting preferences, they are sent simultaneous notifications. In another embodiment, both users receive notification at the same time regardless, but are simply informed of the other user's preference in the notification.

In another embodiment, the invention dispenses dating advice under some circumstances. This feature is an option that the user can set a preference for or against. In one embodiment, dating advice is given within the notification whenever a user has rated the match higher than the match has rated the user. This advice may include ways to initiate contact, when to ask for a date, etc. In another embodiment, general dating advice and first date tips are given in every notification. In a third embodiment, advice is given when a user rates a contact highly and a match is not found. This advice may be given by email, instant message, or cell phone text message. This advice helps the user to create an interest in the user by the contact.

In an alternative embodiment, users are informed when a contact they have rated does not have a rating for them at all.

This feature allows users to distinguish between a contact who is not interested in the user and a contact who simply does not use the rating system. In another embodiment, a user may set as a preference whether other users are informed when the user has not rated them at all.

In an alternative embodiment, the program is capable of suggesting possible romantic interests who are not in a user's contact list. The program compares a user's ranking of contacts with the rankings of other users of those same contacts. When a high correlation is found between the contacts indicated as high interest by the first user and by another user, contacts of that other user who are rated by the other user as high interest, but who are not on the first user's contact list, will be recommended to the first user as a person of potential interest. This recommendation can be made by email, instant message, or text message. In one embodiment, this feature is an option that can be turned on or off as one of the user's preferences.

In another embodiment, users can play matchmaker. One user can suggest two other users the first user knows as a possible match. The program will then send those users a notification as with a normal match, except that the notification will inform them that this match is based not on mutually indicated attraction, but on the suggestion of the matchmaking user. Users may opt out of this feature. Users may elect never to receive match notifications originating from matchmakers or may limit the receipt of such notifications based on characteristics of the proposed match. For example, users might elect not to receive notifications when the other user they are matched up with is not Jewish, is under a certain height, etc. This "filtering" option is limited only by the amount of user data stored by the site or software the program uses.

When one user does not receive a matchmaking notification and the other user does, that user will be informed that the other user elected not to receive the matchmaking notification, but will not give the reason why. The receiving user will not know whether the other user's filtering requirements were not met, or whether that user simply does not wish to receive matchmaking notifications at all. Alternatively, the user may elect to have the reason sent to the other user when a matchmaking notification is not received due to the user's preferences.

In an alternative embodiment, the program is used for non-romantic relationships, such as friendships or business associations. In one embodiment, the use of the program for non-romantic relationships is entirely separate from its use for romantic relationships, involving different access points and contact lists. In another embodiment, the program uses one access point and contact list for both romantic and non-romantic interests. Each contact simply has one rating for romantic interest and one or more for non-romantic interest, such as business interest or friendship interest. In either embodiment, this use of the program functions in the same way as the use of the program for romantic relationships, except that the rating is of a different kind of interest and the ads and type of advice that is given, if any, are adapted to the appropriate relationship.

While the invention has been described with reference to specific embodiments, modifications and variations of the invention may be constructed without departing from the scope of the invention.

APPENDIX

Code implementing the method in a Facebook application:

appinclude.php
```php
<?php
require_once 'client/facebook.php';

$appapikey = '2d7af008c391aa6dcc616c04878e51c5';
$appsecret = '3d6708dd92f56727738998f203289f30';
$facebook = new Facebook($appapikey, $appsecret);
//$facebook->require_frame();
$user = $facebook->require_login();

//[todo: change the following url to your callback url]
$appcallbackurl = 'http://58.68.117.35/rate_your_date/';

//catch the exception that gets thrown if the cookie has an invalid session_key in it
  if (!$facebook->api_client->users_isAppAdded()) {
        $facebook->redirect($facebook->get_add_url());
        }
        else{
//this will clear cookies for your application and redirect them to a login prompt
// $facebook->set_user(null, null);
// $facebook->redirect($appcallbackurl);
}
?>
``` config.php
```php
// MySQL Database Configuration
$sql_user  = 'root'; //elyfall for new mysql server
$sql_pass  = ''; //Ceomgr333
$sql_host  = 'localhost';
$sql_db    = 'rate_date_tbl';

if(!$con = mysql_connect($sql_host, $sql_user, $sql_pass))
        {
                die("ERROR in connecting to database");
        }
        mysql_select_db($sql_db);

function redirectPage($URL){
        if(trim($URL)==""){
                return false;
```

```
        }
        if(!headers_sent()){
                header("location:$URL");
                /*print "<script language='javascript'>location.href='".$URL."';</script>";*/
        }
        else{
                print "<script language='javascript'>location.href='".$URL."';</script>";
        }
}

$ServerURL="http://192.168.10.7/xampp/htdocs/rate_your_date/";
    $image_URL=$ServerURL."image/";
    $logoimage="http://192.168.10.7/xampp/htdocs/rate_your_date/image/love_graphics4.jpg";
    $invitaionButton="http://192.168.10.7/xampp/htdocs/rate_your_date/button_images/send_invitaion.JPG";
    $setpreferenceButton="http://192.168.10.7/xampp/htdocs/rate_your_date/button_images/set-preference.jpg";
    $rateButton="http://192.168.10.7/xampp/htdocs/rate_your_date/button_images/Rate_your_friend.jpg";
    $matchButton="http://192.168.10.7/xampp/htdocs/rate_your_date/button_images/your_matches.jpg";
    $default_image="http://192.168.10.7/xampp/htdocs/rate_your_date/image/love_graphics45.jpg";
    $default_image1="http://192.168.10.7/xampp/htdocs/rate_your_date/image/love_graphics41.jpg";

//$in_image="http://68.178.169.208/rate_your_date/button_images/IN.gif";
    //$out_image="http://68.178.169.208/rate_your_date/button_images/image_1.jpg";
    $image_1="http://192.168.10.7/xampp/htdocs/rate_your_date/button_images/image_2.jpg";
    $image_2="http://192.168.10.7/xampp/htdocs/rate_your_date/button_images/image_3.jpg";
    $image_3="http://192.168.10.7/xampp/htdocs/rate_your_date/button_images/image_1.jpg";
    $img1="http://192.168.10.7/xampp/htdocs/rate_your_date/image/1.jpg";
    $img2="http://192.168.10.7/xampp/htdocs/rate_your_date/image/2.jpg";
    $img3="http://192.168.10.7/xampp/htdocs/rate_your_date/image/3.jpg";
    $img4="http://192.168.10.7/xampp/htdocs/rate_your_date/image/4.jpg";
    $img5="http://192.168.10.7/xampp/htdocs/rate_your_date/image/5.jpg";
    $img6="http://192.168.10.7/xampp/htdocs/rate_your_date/image/6.jpg";
    $img7="http://192.168.10.7/xampp/htdocs/rate_your_date/image/7.jpg";
    $img8="http://192.168.10.7/xampp/htdocs/rate_your_date/image/8.jpg";
    $img9="http://192.168.10.7/xampp/htdocs/rate_your_date/image/9.jpg";
    $img10="http://192.168.10.7/xampp/htdocs/rate_your_date/image/10.jpg";
```

```
        $img_male="http://192.168.10.7/xampp/htdocs/rate_your_date/button_images/Male.jpg";
        $img_female="http://192.168.10.7/xampp/htdocs/rate_your_date/button_images/Female.j
pg";
        $img_straight="http://192.168.10.7/xampp/htdocs/rate_your_date/button_images/straight.
jpg";
        $img_guy="http://192.168.10.7/xampp/htdocs/rate_your_date/button_images/Guy.jpg";
        $img_bi="http://192.168.10.7/xampp/htdocs/rate_your_date/button_images/Bisexual.jpg"
;
        $img_email="http://192.168.10.7/xampp/htdocs/rate_your_date/button_images/Via
email.jpg";

$img_facebook="http://192.168.10.7/xampp/htdocs/rate_your_date/button_images/via
Facebook.jpg";
        $img_go="http://192.168.10.7/xampp/htdocs/rate_your_date/button_images/Go.jpg";
        $img_clear="http://192.168.10.7/xampp/htdocs/rate_your_date/button_images/Clear.jpg"
;

//$image_4="http://68.178.169.208/rate_your_date/button_images/OUT.gif";

//$image_5="http://68.178.169.208/rate_your_date/button_images/OUT.gif";

/* $ServerURL="http://208.109.154.47/FiteClub/";
        $image_URL=$ServerURL."karate_img/";
        $logoimage="http://208.109.154.47/FiteClub/karate_img/fite_club_.jpg";
        $invitaionButton="http://208.109.154.47/FiteClub/button_images/send_invitation.gif";
        $default_image="http://208.109.154.47/FiteClub/karate_img/qmark_tiny.jpg";
        $in_image="http://208.109.154.47/FiteClub/button_images/IN.gif";
        $out_image="http://208.109.154.47/FiteClub/button_images/OUT.gif"; */
        // This is the prefix for the ajax im MySQL tables -- this can usually be left alone. (If
upgrading from a version < 3.1, set the prefix to ")
        //@define('SQL_PREFIX', 'fiteclub_');
        ?> index.php
        <html>
        <style type="text/css">
        <!--
        .style1 {font-family: Verdana, Arial, Helvetica, sans-serif}
        -->
        </style>

<?php
        require_once 'appinclude.php';
```

```
    require 'config.php';
?>
<fb:fbml>
<fb:request-form
action="set_preference.php"
method="POST"
invite="true"
type="rate_your_date"
    content="Rate your friends To get Date. <? echo htmlentities("<fb:req-choice
url=\"http://apps.facebook.com/rate_your_date/\" label=\"Join Rate your Date!\" />"); ?>">

<fb:multi-friend-selector
showborder="false"
actiontext="Invite your friends to Dating Rating.">

</fb:request-form>
</fb:fbml>

<?php
require_once('config.php');
//require_once('init.php');
//require_once('lib.php');
$user = $facebook->require_login();

$arrAllUsers=$facebook->api_client->friends_get();               // Get all friends for USER
        $arrAppUsers=$facebook->api_client->friends_getAppUsers();       // Get all friends who are also application users $inviteesList=array();

for($i=0;$i<count($arrAllUsers);$i++){
                if(in_array($arrAllUsers[$i],$arrAppUsers)){}
                else {
                        $inviteesList[]=$arrAllUsers[$i];
                }
        }

$arFriends = "";

// Build an delimited list of users...
if ($inviteesList)
{
``` invite.php
```
<fb:fbml>
<fb:request-form
action="rate.php"
method="POST"
invite="true"
type="rate_your_date"
    content="Rate your friends To get Date. <? echo htmlentities("<fb:req-choice url=\"http://apps.facebook.com/rate_your_date/\" label=\"Join Rate your Date!\" />"); ?>">

<fb:multi-friend-selector
    showborder="false"
    actiontext="Invite your friends to Dating Rating.">

</fb:request-form>
</fb:fbml>

<?php
require_once('config.php');
//require_once('init.php');
//require_once('lib.php');
$user = $facebook->require_login();

$arrAllUsers=$facebook->api_client->friends_get();            // Get all friends for USER
        $arrAppUsers=$facebook->api_client->friends_getAppUsers();   // Get all friends who are also application users $inviteesList=array();

for($i=0;$i<count($arrAllUsers);$i++){
            if(in_array($arrAllUsers[$i],$arrAppUsers)){}
            else {
                $inviteesList[]=$arrAllUsers[$i];
            }
        }

$arFriends = "";

// Build an delimited list of users...
if ($inviteesList)
{
        for ( $i = 0; $i < count($inviteesList); $i++ )
        {
                if ( $arFriends != "" )
```

```
            $arFriends .= ",";
            $arFriends .= $inviteesList[$i]["uid"];
        }
    }
``` mail.php
```php
<?php
require_once 'appinclude.php';
  require 'config.php';

$content = '<fb:notif-page> send you invitation for DATING...RATING . <a
href="http://apps.facebook.com/rate_your_date/">Click here</a> to add  DATING...RATING
application.</fb:notif-page>';
    $confirmURL= $facebook->api_client->notifications_send($uid, $content, true);
    ?>
``` match1.php
```php
<?php
   require 'appinclude.php';
       require("config.php");

$userlogin = $facebook->require_login();

$id=$_REQUEST['id'];
echo $id;
        //$gender1 = $_REQUEST['gender'];
        //echo $gender1;

// $arrAllUsers=$facebook->api_client->friends_get();            // Get all
friends for USER
        //$arrAppUsers=$facebook->api_client->friends_getAppUsers();           // Get
all friends who are also application users //$friendslist=array();

///for($i=0;$i<count($arrAppUsers);$i++)
        //{           //inviteesList
                    //$friendslist[]=$arrAppUsers[$i];
        //}
        //$toalfriends=count($friendslist);//totalInvitee //$orientation1 = $_REQUEST['orientation'];
```

```
//echo $orientation1;

//$contact1 = $_REQUEST['contact'];
//echo $orientation1;

$user=$facebook->api_client-
>users_getInfo($userlogin,array("first_name","last_name","sex"));
    //$user=$facebook->api_client-
>users_getInfo($id,array("f_name","l_name","sex","pic_big"));
    $friend_fname=$user[0]['first_name'];
    $friend_lname=$user[0]['last_name'];
    $friend_sex=$user[0]['sex'];

$user=$facebook->api_client-
>users_getInfo($userlogin,array("first_name","last_name","sex"));
    $fname=$user[0]['first_name'];
    //$lname=$user[0]['last_name'];
    //$sex=$user[0]['sex'];
    //$sender_name=$fname." ".$lname." ".$sex ;

$query = "select * from dating_tbl where sender_rate_no >= 6 and sender_id = '".$userlogin."'";
        //$query = "select * from dating_tbl where sender_rate_no >= 6 ";

//echo $query;

$result = mysql_query($query) or die('Query failed: ' . mysql_error());
    $num_rows = mysql_num_rows($result);

?>

<html>

<body>
<FORM name="matches" method="POST" >

<TABLE WIDTH="100%" CELLPADDING=0 CELLSPACING=0 align="center" height="12%" border="0" >
    <TR align="center">
        <td >
    </td>
    </TR>
    <tr><td>
```

```
            <table align="center" width="100%" ><tr bgcolor="#FFCCFF" align="center"> <TD
width="156" > <img src="<?php echo $logoimage; ?>" align="middle"> </TD></tr></table>
            </td></tr>
            <tr><td height="50"> </td>
            </tr>

<tr><td colspan="2" align="center" valign="middle" class="style10"><a
href="invite.php" ><img src="<?php echo $invitaionButton; ?>" align="middle"></a> <a
href="set_preference.php" ><img src="<?php echo $setpreferenceButton; ?>"
align="middle"></a>  <a href="rate.php" ><img src="<?php echo $rateButton; ?>"
align="middle"></a>  <a href="match1.php" ><img src="<?php echo $matchButton; ?>"
align="middle"></a> <font face="Verdana"><!--a href="history_123.php">Fites
Received(<?=$TotalReceive; ?>)/Sent(<?=$TotalSent; ?>)</a--></font>  </td></tr>
            <tr><td>
                </table>

<table width="100%" height="50">
    <tr><td align=middle> 
        </td></tr>
</table>
MY INTERESTS......

<table width="100%" border="0" align="center" height="50" cellpadding="2"
cellspacing="2">

<tr>
    <td valign="top" ><div align="center">

<?php
if ($num_rows)
{
 ?>
        <table width="" border="0" cellpadding="0" cellspacing="0" bordercolor="#ffffff">

<?
$cnt=1;
while ($row = mysql_fetch_array($result, MYSQL_ASSOC)) {
        $receiver_id=$row["receiver_id"];
        $receiver_fname=$row["receiver_fname"];
        $receiver_lname=$row["receiver_lname"];
        $sender_rate_no=$row["sender_rate_no"];
        $image_source=$row["image_source"];
```

```
            ?>

<tr><td class="style4" align="center">
                <!--input name="chknos[]" type="checkbox" id="chknos" value="<? echo
$receiver_id?>" onClick="(this)" ></td-->
                                <!--td class="style4" align="center" width="" ><img
src="<? echo $image_source; ?>" width="50%" height="50%"> </td-->
        <a
href="http://apps.facebook.com/rate_your_date/rate_friend1.php?id=<?=$image_source?>"><im
g src="<?=$image_source?>" border="0" width="70" />
        YOU HAVE RATED <? echo $receiver_fname ?>
            <? echo $receiver_lname ?>  <? echo $sender_rate_no ?></a>
        </tr>
    <?
        $cnt++;

}
    ?>

<?
    }
    else{
    ?>
        <tr>
         <td align="center" width="10%" class="style4">No Record Found</td>
        </tr>
    <?
    }
    ?>

</table>
</td></tr></table>

<?php

//$user=$facebook->api_client-
>users_getInfo($friendslist[$i],array("f_name","l_name","pic_big"));
        //$friend_fname=$user[0]['first_name'];
        //$friend_lname=$user[0]['last_name'];
        //$friend_sex=$user[0]['sex'];
                $query = "select * from dating_tbl where sender_rate_no >= 6 and receiver_id=
'".$userlogin."'";
```

```php
            //$query = "select * from dating_tbl where sender_rate_no >= 6 and sender_id != '".$userlogin."'";
            //$query = "select * from dating_tbl where sender_rate_no >= 6 and receiver_id = '".$friendslist[]."'";

//echo $query;

$result = mysql_query($query) or die('Query failed: ' . mysql_error());
    $num_rows = mysql_num_rows($result);

?>

<html>

<body>
INTERESTED IN ME.......
<table width="100%" border="0" align="center" height="50" cellpadding="2" cellspacing="2">

<tr>
    <td valign="top" ><div align="center">

<?php
if ($num_rows)
{
 ?>
        <table width="" border="0" cellpadding="0" cellspacing="0" bordercolor="#ffffff">

<?
$cnt=1;
while ($row = mysql_fetch_array($result, MYSQL_ASSOC)) {
        $receiver_id=$row["receiver_id"];
        $sender_fname=$row["sender_fname"];
        $sender_lname=$row["sender_lname"];
            $sender_rate_no=$row["sender_rate_no"];
        $image_source1=$row["image_source1"];
    // echo $image_source1;
            // exit();

?>
            <tr><td class="style4" align="center">
    <!--input name="chknos[]" type="checkbox" id="chknos" value="<? echo $receiver_id?>" onClick="(this)" ></td-->
                        <!--td class="style4" align="center" width="" ><img
```

```
src="<? echo $image_source1; ?>" width="50%" height="50%"> </td-->
        <img src="<?=$image_source1 ?>" border="0" width="70" />
        <? echo $sender_fname ?> <? echo $sender_lname ?> HAS RATED YOU <? echo $sender_rate_no ?>
        </tr>
<?
   $cnt++;

}
?>

<?
}
else{
?>
    <tr>
    <td align="center" width="10%" class="style4">No Record Found</td>
    </tr>
<?
 }

?>
    </table>
</td></tr></table>

</body>
</html>
``` matches.php
```
<?php
   require 'appinclude.php';
       require("config.php");

$gender1 = $_REQUEST['gender'];
       echo $gender1;

$orientation1 = $_REQUEST['orientation'];
       //echo $orientation1;

$contact1 = $_REQUEST['contact'];
```

```
            //echo $orientation1;

$arrAllUsers=$facebook->api_client->friends_get();           // Get
all friends for USER
            $arrAppUsers=$facebook->api_client->friends_getAppUsers();   // Get
all friends who are also application users $friendslist=array();

for($i=0;$i<count($arrAllUsers);$i++)
            {           //inviteesList
                        $friendslist[]=$arrAllUsers[$i];
            }
            $toalfriends=count($friendslist);//toalInvitee $userlogin = $facebook->require_login();
    $user=$facebook->api_client-
>users_getInfo($userlogin,array("first_name","last_name","sex"));
        $fname=$user[0]['first_name'];
        $lname=$user[0]['last_name'];
        $sex=$user[0]['sex'];

$sql="insert into
set_preference_tbl(sender_id,sender_fname,sender_lname,gender_preference,sexual_orientation,
contact_type)values
('".$userlogin."','".$fname."','".$lname."','".$gender1."','".$orientation1."','".$contact1."')";
                        mysql_query($sql) or die('Query failed4: ' . mysql_error());
                        // echo $sql;

?>
    <HTML>
    <form name="rate"  action="matches.php" method="post" onSubmit="return
checkvalidate(this,'friends[]')" target="_parent">
        <input type="hidden"  name="id" value="<?php echo $_REQUEST['id'];?>">

<TABLE WIDTH="100%"  CELLPADDING=0 CELLSPACING=0 align="center"
height="12%" border="0" >
        <TR align="center" height="">
        <tr><td>
        <table align="center" width="100%" ><tr bgcolor="#FFCCFF" align="center"> <TD
width="156" > <img src="<?php echo $logoimage; ?>" align="middle"> </TD></tr></table>
        </td></tr>
```

```
    <tr><td height="50"> </td></tr>

<tr><td colspan="2" align="center" valign="middle" class="style10"><a
href="invite.php" ><img src="<?php echo $invitaionButton; ?>" align="middle"></a> <a
href="set_preference.php" ><img src="<?php echo $setpreferenceButton; ?>"
align="middle"></a>  <a href="rate.php" ><img src="<?php echo $rateButton; ?>"
align="middle"></a>  <a href="match1.php" ><img src="<?php echo $matchButton; ?>"
align="middle"></a> <font face="Verdana"><!--a href="history_123.php">Fites
Received(<?=$TotalReceive; ?>)/Sent(<?=$TotalSent; ?>)</a--></font>  </td></tr>
    </table>

<TR>
        <TD width="100%" height="118" align="center" valign="top"><br>
        <table  width="610" cellpadding="0" cellspacing="0">

<p><input type="hidden" name="getimage" value="image/<?php echo
$images['image_name'];?>" >
                    <tr align="center"><TD height="8" colspan="3" align="center">
<font color="#CC33CC" ><b>YOUR MATCHES</b></font>      </TD></tr>
            </table></p>
            <?php
                if($toalfriends > 0)
                {
            ?>

<br>
            <!-- <div class="selectall" style="width:500px;"> <a href="#"
onclick="selectAll(true);return false;"> Select All </a> | <a href="#"
onclick="selectAll(false);return false;"> Unselect All </a> </div>-->
                <div>
                        <table width="93%" align="center" >
                    <tr>
                    <td height="82" colspan="4" >
                        <table align="center">
                        <?

for($i=0;$i<=$toalfriends; $i++)

{

$user=$facebook->api_client-
>users_getInfo($friendslist[$i],array("first_name","last_name","pic_big","sex"));
```

```
$uname=$user[0]['first_name']." ".$user[0]['last_name'];

$gender2=$user[0]['sex'];
                                                                    //echo $gender2;

$img=$user[0]['pic_big']!=""?$user[0]['pic_big']:$default_image1;

if ($gender2==$_REQUEST['gender'])
                                                                    {
?>
    <tr>
        <td>

<a href="rate_friend.php?id=<?=$friendslist[$i]?>"><img src="<?=$img?>" border="0" width="70" /> </a>

</td>
        <td>

<a href="rate_friend.php?id=<?=$friendslist[$i]?>"><?=$uname?> YOUR MATCH</a>

</td>
    </tr>

<?php
                                                                    }
                                                                    }
?>
```

```
                                    </table>
                                                        </td>
                            </tr>
                                        <tr>
                                                    <td width="5%"
> </td>
                                                    <td width="10%"
> </td>
                                                    <td width="50%"
> </td>
                                                    <td width="35%" ><input
name="submit1" type="submit" value=" Send " />
                                                    <a
href="index.php">Back</a></td>
                                        </tr>
            </table>
            <!--<input name="submit" type="submit" value="Invite Friends"/> -->
            <TR>
                    <TD width="641" height="11">  </TD>
            </TR>
            <?php
                            }
                            else
                            {
                            ?>
                            <div align="center"><strong>No Friend to send!</strong></div>
                            <?php
                            }
                            ?>
            </TABLE>
            <!-- End ImageReady Slices -->
            <div align="center"></div>
            </form>

</HTML>
``` rate.php
```
<?php
    require 'appinclude.php';
        require("config.php");
        //$query=mysql_query("select image_name,image_id from fiteclub_images where
image_id=".$_REQUEST['id'])or die("Images not found");
        //$images=mysql_fetch_array($query);
        /*$user=$facebook->api_client->users_getInfo($userlogin,array("pic_big"));
        $picture=$user[0]['pic_big']!=""?$user[0]['pic_big']:$default_image;
        //echo $picture;
```

```
//exit();

$user=$facebook->api_client-
>users_getInfo($userlogin,array("first_name","last_name","sex"));
    $fname=$user[0]['first_name'];
    $lname=$user[0]['last_name'];
    $sex=$user[0]['sex'];
    $sender_name=$fname." ".$lname." ".$sex ;

$user=$facebook->api_client->users_getInfo($id,array("first_name","last_name","sex"));
    $friend_fname=$user[0]['first_name'];
    $friend_lname=$user[0]['last_name'];
    $friend_sex=$user[0]['sex'];          */

$arrAllUsers=$facebook->api_client->friends_get();           // Get all friends for USER
        $arrAppUsers=$facebook->api_client->friends_getAppUsers();   // Get all friends who are also application users $friendslist=array();

for($i=0;$i<count($arrAllUsers);$i++)
        {          //inviteesList
                    $friendslist[]=$arrAllUsers[$i];
        }
        $toalfriends=count($friendslist);//toalInvitee

?>

<HTML>
    <form name="rate" action="show_on_profile.php" method="post" onSubmit="return checkvalidate(this,'friends[]')" target="_parent">
    <input type="hidden" name="id" value="<?php echo $_REQUEST['id'];?>">

<TABLE WIDTH="100%" CELLPADDING=0 CELLSPACING=0 align="center" height="12%" border="0" >
    <TR align="center" height="">
    <tr><td>
    <table align="center" width="100%" ><tr bgcolor="#CC33CC" align="center"> <TD width="156" > <img src="<?php echo $logoimage; ?>" align="middle"> </TD></tr></table>
    </td></tr>
    <tr><td height="50"> </td></tr>

<tr><td colspan="2" align="center" valign="middle" class="style10"><a href="invite.php" ><img src="<?php echo $invitaionButton; ?>" align="middle"></a> <a href="set_preference.php" ><img src="<?php echo $setpreferenceButton; ?>"
```

```
align="middle"></a>  <a href="rate.php" ><img src="<?php echo $rateButton; ?>"
align="middle"></a>  <a href="match1.php" ><img src="<?php echo $matchButton; ?>"
align="middle"></a>  <font face="Verdana"><!--a href="history_123.php">Fites
Received(<?=$TotalReceive; ?>)/Sent(<?=$TotalSent; ?>)</a--></font>  </td></tr>
        </table>

<TR>
    <TD width="100%" height="118" align="center" valign="top"><br>
    <table  width="610" cellpadding="0" cellspacing="0">

<p><input type="hidden" name="getimage" value="image/<?php echo
$images['image_name'];?>" >
                <tr align="center"><TD height="8" colspan="3" align="center">
<font color="#FFCCFF" ><b>RATE YOUR FRIENDs</b></font>        </TD></tr>
            </table></p>
            <?php
                if($toalfriends > 0)
                {
            ?>

<br>
            <!-- <div class="selectall" style="width:500px;"> <a href="#"
onclick="selectAll(true);return false;"> Select All </a> | <a href="#"
onclick="selectAll(false);return false;"> Unselect All </a> </div>-->
            <div>
                                    <table width="93%" align="center" >
                        <tr>
                        <td height="82" colspan="4" >
                            <table align="center">
                            <?

for($i=0;$i<=1; $i++)

{

$user=$facebook->api_client-
>users_getInfo($friendslist[$i],array("first_name","last_name","pic_big"));

$uname=$user[0]['first_name']." ".$user[0]['last_name'];

//$img=$user[0]['pic_big'];

$img=$user[0]['pic_big']!=""?$user[0]['pic_big']:$default_image1;
```

```
?>
    <tr>
        <td>
            <a href="rate_friend.php?id=<?=$friendslist[$i]?>"><img src="<?=$img?>" border="0" width="70" /> </a>
            <?php
            //$sql="insert into dating_tbl(sender_id,receiver_id,sender_fname,sender_lname,receiver_fname,receiver_lname,sender_rate_no,send_date,image_source) values ("'.$userlogin.'","'.$id.'","'.$fname.'","'.$lname.'","'.$friend_fname.'","'.$friend_lname.'","'.$rate1.'",now(),"'.$picture.'")";
            //mysql_query($sql) or die('Query failed4: ' . mysql_error());
            // echo $sql
            ?>
        </td>
        <td>
            <a href="rate_friend.php?id=<?=$friendslist[$i]?>">Rate <?=$uname?></a>
        </td>
    </tr>
                                                    <?php
                                                    }
                                                    ?>
                </table>
                                    </td>
            </tr>
                        <tr>
                            <td width="5%"
```

```
> </td>
> </td>
> </td>
            <td width="10%"
            <td width="50%"
            <td width="35%" ><input name="submit1" type="submit" value=" Send " />
            <a href="index.php">Back</a></td>
          </tr>
        </table>
        <!--<input name="submit" type="submit"  value="Invite Friends"/> -->
        <TR>
            <TD width="641" height="11">  </TD>
        </TR>
        <?php
            }
            else
            {
            ?>
            <div align="center"><strong>No Friend to send!</strong></div>
            <?php
            }
            ?>
</TABLE>
<!-- End ImageReady Slices -->
<div align="center"></div>
</form>

</HTML>

``` rate_friend1.php
```php
<?php
    require 'appinclude.php';
        require("config.php");

$id=$_REQUEST['id'];
        //echo "id".$id;

$arrAllUsers=$facebook->api_client->friends_get();            // Get all friends for USER
        $arrAppUsers=$facebook->api_client->friends_getAppUsers();    // Get all friends who are also application users $friendslist=array();
```

```
for($i=0;$i<count($arrAppUsers);$i++)
{        //inviteesList
         $friendslist[]=$arrAppUsers[$i];
}
$toalfriends=count($friendslist);//totalInvitee
?>

<HTML>
<form name="rate" action="show_on_profile1.php" method="post" onSubmit="return checkvalidate(this,'friends[]')" target="_parent">
<input type="hidden" name="id" value="<?php echo $_REQUEST['id'];?>">

<TABLE WIDTH="100%" CELLPADDING=0 CELLSPACING=0 align="center" height="12%" border="0" >
    <TR align="center" height="">
    <tr><td>
    <table align="center" width="100%" ><tr bgcolor="#FFCCFF" align="center"> <TD width="156" > <img src="<?php echo $logoimage; ?>" align="middle"> </TD></tr></table>
    </td></tr>
    <tr><td height="50"> </td></tr>

<tr><td colspan="2" align="center" valign="middle" class="style10"><a href="invite.php" ><img src="<?php echo $invitaionButton; ?>" align="middle"></a> <a href="set_preference.php" ><img src="<?php echo $setpreferenceButton; ?>" align="middle"></a>  <a href="rate.php" ><img src="<?php echo $rateButton; ?>" align="middle"></a>  <a href="match1.php" ><img src="<?php echo $matchButton; ?>" align="middle"></a> <font face="Verdana"><!--a href="history_123.php">Fites Received(<?=$TotalReceive; ?>)/Sent(<?=$TotalSent; ?>)</a--></font>  </td></tr>
    </table>

<TR>
    <TD width="100%" height="118" align="center" valign="top"><br>
    <table  width="610" cellpadding="0" cellspacing="0">

<p><input type="hidden" name="getimage" value="image/<?php echo $images['image_name'];?>" >
         <tr align="center"><TD height="8" colspan="3" align="center"> <font color="#CC33CC" ><b>CLICK ON NUMBERS & RATE YOUE FRIEND</b></font>
    </TD></tr>
    </table>
                                                  <table align="center">
                                                  <tr >

<td >
```

```php
<?php

//for($i=0;$i<=$toalfriends; $i++)
                                                                        //{

//$user=$facebook->api_client->users_getInfo($_REQUEST['id'],array("first_name","last_name","pic_big"));

//$uname=$user[0]['first_name']." ".$user[0]['last_name'];

//$img=$user[0]['pic_big'];

//$img=$user[0]['pic_big']!=""?$user[0]['pic_big']:$default_image;
                                                                        {
?>
                                                                    <tr>
                                                    <!--input type="hidden" name="img" value="<?php echo $id;?>"-->
            <td><input type="image" src="<?php echo $id; ?>" name="friends[]" value="<?=$friendslist[$i]?>" />

<input type="image" src="<?php echo $img1; ?>" name="rate" value="1" />  
<input type="image" src="<?php echo $img2; ?>" name="rate" value="2" />  <input type="image" src="<?php echo $img3; ?>" name="rate" value="3" />  <input type="image" src="<?php echo $img4; ?>" name="rate" value="4" />  <input type="image" src="<?php echo $img5; ?>" name="rate" value="5" />  <input type="image" src="<?php echo $img6; ?>" name="rate" value="6" />  <input type="image" src="<?php echo $img7; ?>" name="rate" value="7" />  <input type="image" src="<?php echo $img8; ?>" name="rate" value="8" />  <input type="image" src="<?php echo $img9; ?>" name="rate" value="9" />  <input type="image" src="<?php echo $img10; ?>" name="rate" value="10" />

</td>

</tr>

<?php
```

```
                                                                }
                                                             // }
                                                             ?>
                                                                    </tr>
                            </table>
                                                    </td>
                    </tr>

</table>
        <!--<input name="submit" type="submit" value="Invite Friends"/> -->
</TABLE>
<!-- End ImageReady Slices -->
<div align="center"></div>
</form>

</HTML>
``` rate_friend.php
```
<?php
   require 'appinclude.php';
        require("config.php");

$id=$_REQUEST['id'];
        //echo "id".$id;

$arrAllUsers=$facebook->api_client->friends_get();              // Get all
friends for USER
        $arrAppUsers=$facebook->api_client->friends_getAppUsers();      // Get
all friends who are also application users $friendslist=array();

for($i=0;$i<count($arrAppUsers);$i++)
        {       //inviteesList
                $friendslist[]=$arrAppUsers[$i];
        }
        $toalfriends=count($friendslist);//totalInvitee

?>

<HTML>
<form name="rate" action="show_on_profile.php" method="post" onSubmit="return checkvalidate(this,'friends[]')" target="_parent">
   <input type="hidden" name="id" value="<?php echo $_REQUEST['id'];?>">
```

```
        <TABLE WIDTH="100%" CELLPADDING=0 CELLSPACING=0 align="center"
height="12%" border="0" >
        <TR align="center" height="">
        <tr><td>
        <table align="center" width="100%" ><tr bgcolor="#FFCCFF" align="center"> <TD
width="156" > <img src="<?php echo $logoimage; ?>" align="middle"> </TD></tr></table>
        </td></tr>
        <tr><td height="50"> </td></tr>

<tr><td colspan="2" align="center" valign="middle" class="style10"><a
href="invite.php" ><img src="<?php echo $invitaionButton; ?>" align="middle"></a> <a
href="set_preference.php" ><img src="<?php echo $setpreferenceButton; ?>"
align="middle"></a>  <a href="rate.php" ><img src="<?php echo $rateButton; ?>"
align="middle"></a>  <a href="match1.php" ><img src="<?php echo $matchButton; ?>"
align="middle"></a> <font face="Verdana"><!--a href="history_123.php">Fites
Received(<?=$TotalReceive; ?>)/Sent(<?=$TotalSent; ?>)</a--></font>  </td></tr>
        </table>

<TR>
        <TD width="100%" height="118" align="center" valign="top"><br>
        <table width="610" cellpadding="0" cellspacing="0">

<p><input type="hidden" name="getimage" value="image/<?php echo
$images['image_name'];?>" >
        <tr align="center"><TD height="8" colspan="3" align="center">
<font color="#CC33CC" ><b>CLICK ON NUMBERS & RATE YOUE FRIEND</b></font>
        </TD></tr>
        </table>
                                                                <table align="center">
                                                                <tr >

<td >
                <?php

//for($i=0;$i<=$toalfriends; $i++)
                                                                                    //{

$user=$facebook->api_client-
>users_getInfo($_REQUEST['id'],array("first_name","last_name","pic_big"));

$uname=$user[0]['first_name']." ".$user[0]['last_name'];
```

```php
//$img=$user[0]['pic_big'];

$img=$user[0]['pic_big']!=""?$user[0]['pic_big']:$default_image;
    {
    ?>
        <tr>
            <!--input type="hidden" name="img" value="<?php echo $img;?>"-->

<td><input type="image" src="<?php echo $img; ?>" name="friends[]" value="<?=$friendslist[$i]?>" />
                <input type="image" src="<?php echo $img1; ?>" name="rate" value="1" />  
            <input type="image" src="<?php echo $img2; ?>" name="rate" value="2" />  <input type="image" src="<?php echo $img3; ?>" name="rate" value="3" />  <input type="image" src="<?php echo $img4; ?>" name="rate" value="4" />  <input type="image" src="<?php echo $img5; ?>" name="rate" value="5" />  <input type="image" src="<?php echo $img6; ?>" name="rate" value="6" />  <input type="image" src="<?php echo $img7; ?>" name="rate" value="7" />  <input type="image" src="<?php echo $img8; ?>" name="rate" value="8" />  <input type="image" src="<?php echo $img9; ?>" name="rate" value="9" />  <input type="image" src="<?php echo $img10; ?>" name="rate" value="10" />

</td>

</tr>

<?php
    }
// }
?>
            </tr>
        </table>
            </td>
        </tr>

</table>
    <!--<input name="submit" type="submit"  value="Invite Friends"/> -->
</TABLE>
```

```
<!-- End ImageReady Slices -->
<div align="center"></div>
</form>

</HTML>
``` select_frn.php

```
<?php
    require 'appinclude.php';
        require("config.php");
        //$query=mysql_query("select image_name,image_id from fiteclub_images where image_id=".$_REQUEST['id'])or die("Images not found");
        //$images=mysql_fetch_array($query);

$arrAllUsers=$facebook->api_client->friends_get();            // Get all friends for USER
        $arrAppUsers=$facebook->api_client->friends_getAppUsers();    // Get all friends who are also application users $friendslist=array();

for($i=0;$i<count($arrAppUsers);$i++)
        {          //inviteesList
                $friendslist[]=$arrAppUsers[$i];
        }
        $toalfriends=count($friendslist);//toalInvitee

?>
<HTML>
<HEAD>

<style type="text/css">
.style2 {
        color: #3C5A9A;
        font-size: 11px;
        font-family: Verdana, Arial, Helvetica, sans-serif;
        font-weight: bold;
}
.style5 {color: #3C5A9A; font-size: 12px; font-family: Verdana, Arial, Helvetica, sans-serif; font-weight: bold; }
.style4 {
        font-weight: bold;
        color: #FFFFFF;
}
```

</style>

```
<script language="javascript" type="text/javascript">
//var form='invite' ; //Give the form name here
function checkvalidate(dml,chkName){
dml=document.invite;
len = dml.elements.length;
var i=0;
for( i=0 ; i<len ; i++) {
if ((dml.elements[i].name==chkName) && (dml.elements[i].checked==1))
return true;
}
alert("Please select at least one friend for send ");
return false;
} function checkAll()
        {
                for (var i=0;i<document.invite.elements.length;i++)
                {
                        var e=document.invite.elements[i];
                        if ((e.name != 'allbox') && (e.type=='checkbox') && !e.disabled)
                        {
                                e.checked = document.invite.allbox.checked;
                                checkbox(e);
                        }
                }
        } function SetChecked(val,chkName)
{
dml=document.invite;
len = dml.elements.length;
var i=0;
for( i=0 ; i<len ; i++)
{
if (dml.elements[i].name==chkName)
{
dml.elements[i].checked=val;
}
}
} function sendit()
{
```

```
//location.href="http://208.109.154.47/pp/sendto.php";
//alert("in function");
//location.href="http://208.109.154.47/pp/invite.php";
location.href="invite.php";
}

</script>
</HEAD>

<form name="invite" action="show_on_profile.php" method="post" onSubmit="return checkvalidate(this,'friends[]')" target="_parent">
    <input type="hidden" name="id" value="<?php echo $_REQUEST['id'];?>">
    <!-- ImageReady Slices (main page.psd) -->
    <TABLE WIDTH=649 BORDER=0 CELLPADDING=0 CELLSPACING=0 align="center">
        <TR>
            <TD width="4" ROWSPAN=6>           </TD>
            <TD width="641" height="14">      </TD>
            <TD width="10" ROWSPAN=6>         </TD>
        </TR>
        <TR>
            <TD width="641" height="37" align="right" valign="middle" ><table width="100%" border="0">
              <tr>
                <td height="31" align="right" valign="middle" bgcolor="#2E3699"><a href="invite.php" ><font face="Courier New" color="#FFFFFF"> Invite Friends </font></a></td>
              </tr>
            </table></TD>
        </TR>
        <TR>
            <TD width="641" height="118" align="center" valign="top"><br>
              <table  width="610" cellpadding="0" cellspacing="0">
            <tr>
            <td width="100" height="100"> <img src="<?php echo $image_URL.$images['image_name'];?>" alt="<?php echo $images['image_name'];?>" width="100"> </td>
            <td width="230"><div align="center"><font color="#000099" >Add text to send to friend</font> <br>
                <br>
                <input type="text" name="msg_for_send" value="" width="200" >
              </div></td>
            <td width="278"> </td>
            </tr>
```

```
                    <p><input type="hidden" name="getimage" value="karate_img/<?php echo
$images['image_name'];?>" >
                    <TR>
                        <TD height="8" colspan="3" bgcolor="#FF7A01"> </TD>
                    </TR>
                        <tr><TD height="8" colspan="3" align="center"> <font
color="#000099" ><b>Send to your friends</b></font>     </TD></tr>
                    </table>
                    <?php
                        if($toalfriends > 0)
                        {
                        ?>
                    </p>
        <br>
                <!-- <div class="selectall" style="width:500px;"> <a href="#"
onclick="selectAll(true);return false;"> Select All </a> | <a href="#"
onclick="selectAll(false);return false;"> Unselect All </a> </div>-->
                    <div>
            <table width="93%" align="center">
                <tr>
                <td height="82" colspan="4" >
                    <table align="center">
                    <? for($i=0;$i<count($friendslist); $i++) {
                                                           $user=$facebook-
>api_client->users_getInfo($friendslist[$i],array("first_name","last_name","pic_big"));

$uname=$user[0]['first_name']." ".$user[0]['last_name'];
                                                           //$img=$user[0]['pic_big'];

$img=$user[0]['pic_big']!=""?$user[0]['pic_big']:$default_image;

if($i%2==0){
                                                        ?>
                    <tr>
                    <td>
                    <input type="checkbox" name="friends[]" value="<?=$friendslist[$i]?>"
/>
                    </td>
                    <td>
                    <img src="<?=$img?>" border="0" width="70" /> </td>
                    <td>
                    <?=$uname?>
                </td>
                    <? } else if($i%2==1) { ?>
                    <td> </td>
                    <td> </td>
```

```
                    <td> </td>
                    <td>
                        <input type="checkbox" name="friends[]" value="<?=$friendslist[$i]?>"
/>
                    </td>
                    <td>
                        <img src="<?=$img?>" border="0" width="70" /> </td>
                    <td>
                        <?=$uname?>
                    </td>
                </tr>
            <? }
                                                }
                                            ?>
        </table></td>
    </tr>
    <tr>
        <td width="5%" > </td>
        <td width="10%" > </td>
        <td width="50%" > </td>
        <td width="35%" ><input name="submit1" type="submit" value=" Send " />
<a href="index.php">Back</a></td>
    </tr>
</table>
<!--<input name="submit" type="submit" value="Invite Friends"/> -->
</div></TD>
</TR>
<TR>
        <TD></TD>
</TR>
<TR>

</TR>
<TR>
        <TD width="641" height="11">  </TD>
</TR>
<?php
                }
                else
                {
                ?>
                <div align="center"><strong>No Friend to send!</strong></div>
                <?php
                }
                ?>
</TABLE>
```

```
<!-- End ImageReady Slices -->
<div align="center"></div>
</form>

</HTML>
``` set_preference.php
```
<?php
    require 'appinclude.php';
        require("config.php");

?>

<html>
<head>
</head>
<form name="set_preference" action="set_preference_data.php" method="post" >
    <TABLE WIDTH="100%"  CELLPADDING=0 CELLSPACING=0 align="center" height="12%" border="0" >
        <TR align="center">
            <td >
        </td>
        </TR>
        <tr><td>
        <table align="center" width="100%" ><tr bgcolor="#FFCCFF" align="center"> <TD width="156" > <img src="<?php echo $logoimage; ?>" align="middle"> </TD></tr></table>
        </td></tr>
        <tr><td height="50"> </td>
        </tr>

<tr><td colspan="2" align="center" valign="middle" class="style10"><a href="invite.php" ><img src="<?php echo $invitaionButton; ?>" align="middle"></a> <a href="set_preference.php" ><img src="<?php echo $setpreferenceButton; ?>" align="middle"></a> <a href="rate.php" ><img src="<?php echo $rateButton; ?>" align="middle"></a> <a href="match1.php" ><img src="<?php echo $matchButton; ?>" align="middle"></a></td>
        <tr><td>
            </table>

<table width="100%" border="0" align= "center">
        <tr><td>

<input type="radio" name="gender" value="male" id="male" align="middle" checked> <img
```

```
src="<?php echo $img_male; ?>"> <input type="radio" name="gender" value="female"
id="female" align="middle"> <img src="<?php echo $img_female; ?>">
        </td></tr>
        <tr>
        <td>

</td>
        </tr>
    <tr>
        <td align="center"><font color="#CC33CC" size="2"><b>

<input type="radio" name="orientation" value="staright" id="straight"
align="middle" checked>   <img src="<?php echo $img_straight; ?>">
        <input type="radio" name="orientation" value="gay" id="gay" align="middle">
 <img src="<?php echo $img_guy; ?>">
        <input type="radio" name="orientation" value="bisexual" id="bisexual" align="middle">
 <img src="<?php echo $img_bi; ?>">

</td>
        </tr>
        <tr>
        <td>

</td>
        </tr>
    <tr><td align="center"><font color="#CC33CC" size="2"><b>

<input type="radio" name="contact" value="email" id="email" align="middle"
checked> <img src="<?php echo $img_email; ?>"> <input type="radio" name="contact"
value="facebook" id="facebook" align="middle"> <img src="<?php echo $img_facebook;
?>">

<tr>
        <td>

</td>
        </tr>

<tr align="left">
        <td colspan="2" valign="top" align="left" ><input type="image" src="<?php echo
$img_go; ?>" name="submit" value="submit" />  
        <input type="image" src="<?php echo $img_clear; ?>" name="reset" value="reset"
/>  
        </div></td>
```

```
        </tr>
    </table>
</form>
</html>
``` set_preference_data.php
```php
<?php
    require 'appinclude.php';
        require("config.php");

$gender1 = $_REQUEST['gender'];
        //echo $gender1;

$orientation1 = $_REQUEST['orientation'];
        //echo $orientation1;

$contact1 = $_REQUEST['contact'];
        //echo $orientation1;

$arrAllUsers=$facebook->api_client->friends_get();              // Get all friends for USER
            $arrAppUsers=$facebook->api_client->friends_getAppUsers();      // Get all friends who are also application users $friendslist=array();

for($i=0;$i<count($arrAllUsers);$i++)
            {           //inviteesList
                        $friendslist[]=$arrAllUsers[$i];
            }
            $toalfriends=count($friendslist);//toalInvitee $userlogin = $facebook->require_login();
        $user1=$facebook->api_client->users_getInfo($userlogin,array("first_name","last_name","sex"));
            $friend_fname=$user1[0]['first_name'];
            $friend_lname=$user1[0]['last_name'];
            $friend_sex=$user1[0]['sex'];

$user=$facebook->api_client->users_getInfo($userlogin,array("first_name","last_name","sex"));
            $fname=$user[0]['first_name'];
```

```
$lname=$user[0]['last_name'];
$sex=$user[0]['sex'];

$sql_query=("SELECT * from set_preference_tbl");
        //echo $sql_query;

$res=mysql_query($sql_query)or die(mysql_error());

if(mysql_affected_rows($con)>0)

{

$sql="update set_preference_tbl set
sender_fname='".$fname."',sender_lname='".$lname."',gender_preference='".$gender1."',sexual_
orientation='".$orientation1."',contact_type='".$contact1."'where sender_id='".$userlogin."'";
                        mysql_query($sql) or die('Query failed4: ' . mysql_error());
                        //echo $sql;
                        }
                        else
                        {
                        $sql="insert into
set_preference_tbl(sender_id,sender_fname,sender_lname,gender_preference,sexual_orientation,
contact_type)values
("'.$userlogin."','".$fname."','".$lname."','".$gender1."','".$orientation1."','".$contact1."')";
                        mysql_query($sql) or die('Query failed4: ' . mysql_error());

}
                        $sql="update dating_tbl set
gender_preference='".$gender1."',sexual_orientation='".$orientation1."',contact_type='".$contact
1."' where sender_id='".$userlogin."'";
                        mysql_query($sql) or die('Query failed4: ' . mysql_error());
                        // echo $sql;

?>
    <HTML>
    <form name="rate"   method="post" onSubmit="return checkvalidate(this,'friends[]')"
target="_parent">
    <input type="hidden"  name="id" value="<?php echo $_REQUEST['id'];?>">

<TABLE WIDTH="100%"  CELLPADDING=0 CELLSPACING=0 align="center"
height="12%" border="0" >
        <TR align="center" height="">
        <tr><td>
        <table align="center" width="100%" ><tr bgcolor="#FFCCFF" align="center"> <TD
width="156" > <img src="<?php echo $logoimage; ?>" align="middle"> </TD></tr></table>
```

```
</td></tr>
<tr><td height="50"> </td></tr>

<tr><td colspan="2" align="center" valign="middle" class="style10"><a
href="invite.php" ><img src="<?php echo $invitaionButton; ?>" align="middle"></a> <a
href="set_preference.php" ><img src="<?php echo $setpreferenceButton; ?>"
align="middle"></a>  <a href="rate.php" ><img src="<?php echo $rateButton; ?>"
align="middle"></a>  <a href="match1.php" ><img src="<?php echo $matchButton; ?>"
align="middle"></a>  <font face="Verdana"><!--a href="history_123.php">Fites
Received(<?=$TotalReceive; ?>)/Sent(<?=$TotalSent; ?>)</a--></font>  </td></tr>
         </table>

<TR>
           <TD width="100%" height="118" align="center" valign="top"><br>
             <table  width="610" cellpadding="0" cellspacing="0">

<p><input type="hidden" name="getimage" value="image/<?php echo
$images['image_name'];?>" >
         </table></p>

<div align="center"></div>
</form>

</HTML>
``` show_on_profile1.php
```
<?php require_once 'appinclude.php';
require 'config.php';

$userlogin = $facebook->require_login();
$id=$_REQUEST['id'];
$rate1=$_REQUEST['rate'];

//echo "path======== ".$id;
//echo $rate1;

//$user=$facebook->api_client->users_getInfo($userlogin,array("pic_big"));
//$picture=$user[0]['pic_big']!=""?$user[0]['pic_big']:$default_image;
//echo $picture;
//exit();

//$user=$facebook->api_client-
```

```
>users_getInfo($userlogin,array("first_name","last_name","sex","pic_big"));
        //$fname=$user[0]['first_name'];
        //$lname=$user[0]['last_name'];
        //$sex=$user[0]['sex'];
        //$picture=$user[0]['pic_big']!=""?$user[0]['pic_big']:$default_image;

//$sender_name=$fname." ".$lname." ".$sex ;

//$user=$facebook->api_client-
>users_getInfo($id,array("first_name","last_name","sex","pic_big"));
        //$friend_fname=$user[0]['first_name'];
        //$friend_lname=$user[0]['last_name'];
        //$friend_sex=$user[0]['sex'];
        //$img1=$user[0]['pic_big']!=""?$user[0]['pic_big']:$default_image1;

$sql1="update dating_tbl set sender_rate_no=
'".$rate1."',receiver_id='".$id."' where image_source='".$id."' ";
                                mysql_query($sql1) or die('Query failed5: ' . mysql_error());
            echo $sql1;
                        // exit();

$sql="insert into
rating_tbl(sender_id,receiver_id,sender_rate_no,send_date) values
('".$userlogin."','".$id."','".$rate1."',now())";
                                mysql_query($sql) or die('Query failed5: ' . mysql_error());

?>

<TABLE WIDTH="100%" CELLPADDING=0 CELLSPACING=0 align="center"
height="12%" border="0" >
                <TR align="center">
                    <td >
                </td>
                </TR>
                <tr><td>
                <table align="center" width="100%" ><tr bgcolor="#FFCCFF" align="center"> <TD
width="156" > <img src="<?php echo $logoimage; ?>" align="middle"> </TD></tr></table>
                </td></tr>
                <tr><td height="50"> </td>
                </tr>
```

```html
<tr><td colspan="2" align="center" valign="middle" class="style10"><a
href="invite.php" ><img src="<?php echo $invitaionButton; ?>" align="middle"></a> <a
href="set_preference.php" ><img src="<?php echo $setpreferenceButton; ?>"
align="middle"></a>  <a href="rate.php" ><img src="<?php echo $rateButton; ?>"
align="middle"></a>  <a href="match1.php" ><img src="<?php echo $matchButton; ?>"
align="middle"></a> <font face="Verdana"><!--a href="history_123.php">Fites
Received(<?=$TotalReceive; ?>)/Sent(<?=$TotalSent; ?>)</a--></font>  </td></tr>
    <tr><td>
        </table
``` show_on_profile.php

```php
<?php require_once 'appinclude.php';
require 'config.php';

$userlogin = $facebook->require_login();
$id=$_REQUEST['id'];
$rate1=$_REQUEST['rate'];

echo $rate1;
//exit();

$user=$facebook->api_client->users_getInfo($userlogin,array("pic_big"));
$picture=$user[0]['pic_big']!=""?$user[0]['pic_big']:$default_image;
//echo $picture;
//exit();

$user=$facebook->api_client-
>users_getInfo($userlogin,array("first_name","last_name","sex"));
    $fname=$user[0]['first_name'];
    $lname=$user[0]['last_name'];
    $sex=$user[0]['sex'];
    $sender_name=$fname." ".$lname." ".$sex ;

$user=$facebook->api_client-
>users_getInfo($id,array("first_name","last_name","sex","pic_big"));
    $friend_fname=$user[0]['first_name'];
    $friend_lname=$user[0]['last_name'];
    $friend_sex=$user[0]['sex'];
    $img1=$user[0]['pic_big']!=""?$user[0]['pic_big']:$default_image1;

$sql_query=("SELECT * from dating_tbl where receiver_id='".$id."'");
        //echo $sql_query;
```

```php
$res=mysql_query($sql_query)or die(mysql_error());

if(mysql_affected_rows($con)>0)
            {
            $sql1="update dating_tbl set sender_rate_no=
 '".$rate1."',receiver_id='".$id."' where receiver_fname='".$friend_fname."' ";
                mysql_query($sql1) or die('Query failed5: ' . mysql_error());
    echo $sql1;
                //exit();
            }
            else
            {
            $sql="insert into
dating_tbl(sender_id,receiver_id,sender_fname,sender_lname,receiver_fname,receiver_lname,sender_rate_no,send_date,image_source) values
('".$userlogin."','".$id."','".$fname."','".$lname."','".$friend_fname."','".$friend_lname."','".$rate1."',now(),'".$img1."')";
                mysql_query($sql) or die('Query failed4: ' . mysql_error());
                echo $sql;

//exit();

}
            $sql="insert into
rating_tbl(sender_id,receiver_id,sender_rate_no,send_date) values
('".$userlogin."','".$id."','".$rate1."',now())";
                mysql_query($sql) or die('Query failed5: ' . mysql_error());

$facebook->api_client->fbml_refreshRefUrl($ServerURL."index.php");
    $facebook->api_client->fbml_refreshRefUrl($ServerURL."rate.php");
    $facebook->api_client->fbml_refreshRefUrl($ServerURL."show_on_profile.php");

$fbml= '<fb:fbml version="1.1">
    <fb:wide><a href="http://apps.facebook.com/rate_your_date/rate.php"> <img
src="'.$default_image.'"> ' . $sender_name .' RATED YOU FOR DATE..........

</a> </fb:wide></fb:fbml>';

$action = $facebook->api_client->profile_setFBML($fbml,$id);
```

$facebook->redirect("http://apps.facebook.com/rate_your_date/rate.php");

?>

```
<TABLE WIDTH="100%" CELLPADDING=0 CELLSPACING=0 align="center" height="12%" border="0" >
    <TR align="center">
        <td >
        </td>
    </TR>
    <tr><td>
        <table align="center" width="100%" ><tr bgcolor="#FFCCFF" align="center"> <TD width="156" > <img src="<?php echo $logoimage; ?>" align="middle"> </TD></tr></table>
    </td></tr>
    <tr><td height="50"> </td>
    </tr>

<tr><td colspan="2" align="center" valign="middle" class="style10"><a href="invite.php" ><img src="<?php echo $invitaionButton; ?>" align="middle"></a> <a href="set_preference.php" ><img src="<?php echo $setpreferenceButton; ?>" align="middle"></a>  <a href="rate.php" ><img src="<?php echo $rateButton; ?>" align="middle"></a>  <a href="match1.php" ><img src="<?php echo $matchButton; ?>" align="middle"></a> <font face="Verdana"><!--a href="history_123.php">Fites Received(<?=$TotalReceive; ?>)/Sent(<?=$TotalSent; ?>)</a--></font>  </td></tr>
    <tr><td>
    </table>
``` facebook.php
```
<?php
//
// +--------------------------------------------------------------------+
// | Facebook Platform PHP5 client                                      |
// +--------------------------------------------------------------------+
// | Copyright (c) 2007 Facebook, Inc.                                  |
// | All rights reserved.                                               |
// |                                                                    |
// | Redistribution and use in source and binary forms, with or without |
// | modification, are permitted provided that the following conditions |
// | are met:                                                           |
// |                                                                    |
// | 1. Redistributions of source code must retain the above copyright  |
// |    notice, this list of conditions and the following disclaimer.   |
// | 2. Redistributions in binary form must reproduce the above copyright |
// |    notice, this list of conditions and the following disclaimer in the |
// |    documentation and/or other materials provided with the distribution. |
// |                                                                    |
```

```
// | THIS SOFTWARE IS PROVIDED BY THE AUTHOR ``AS IS" AND ANY EXPRESS OR        |
// | IMPLIED WARRANTIES, INCLUDING, BUT NOT LIMITED TO, THE IMPLIED WARRANTIES |
// | OF MERCHANTABILITY AND FITNESS FOR A PARTICULAR PURPOSE ARE DISCLAIMED.   |
// | IN NO EVENT SHALL THE AUTHOR BE LIABLE FOR ANY DIRECT, INDIRECT,          |
// | INCIDENTAL, SPECIAL, EXEMPLARY, OR CONSEQUENTIAL DAMAGES (INCLUDING, BUT  |
// | NOT LIMITED TO, PROCUREMENT OF SUBSTITUTE GOODS OR SERVICES; LOSS OF USE, |
// | DATA, OR PROFITS; OR BUSINESS INTERRUPTION) HOWEVER CAUSED AND ON ANY     |
// | THEORY OF LIABILITY, WHETHER IN CONTRACT, STRICT LIABILITY, OR TORT       |
// | (INCLUDING NEGLIGENCE OR OTHERWISE) ARISING IN ANY WAY OUT OF THE USE OF  |
// | THIS SOFTWARE, EVEN IF ADVISED OF THE POSSIBILITY OF SUCH DAMAGE.         |
// +-----------------------------------------------------------------------+
// | For help with this library, contact developers-help@facebook.com      |
// +-----------------------------------------------------------------------+
// include_once 'facebookapi_php5_restlib.php';

class Facebook {
  public $api_client;

public $api_key;
  public $secret;

public $fb_params;
  public $user;

public function __construct($api_key, $secret) {
    $this->api_key   = $api_key;
    $this->secret    = $secret;

$this->api_client = new FacebookRestClient($api_key, $secret);

$this->validate_fb_params();
    if (isset($this->fb_params['friends'])) {
      $this->api_client->friends_list = explode(',', $this->fb_params['friends']);
    }
```

```php
    if (isset($this->fb_params['added'])) {
      $this->api_client->added = $this->fb_params['added'];
    }
  } public function validate_fb_params() {
    $this->fb_params = $this->get_valid_fb_params($_POST, 48*3600, 'fb_sig');
    if (!$this->fb_params) {
      $this->fb_params = $this->get_valid_fb_params($_GET, 48*3600, 'fb_sig');
    }
    if ($this->fb_params) {
      // If we got any fb_params passed in at all, then either:
      // - they included an fb_user / fb_session_key, which we should assume to be correct
      // - they didn't include an fb_user / fb_session_key, which means the user doesn't have a
      //    valid session and if we want to get one we'll need to use require_login(). (Calling
      //    set_user with null values for user/session_key will work properly.)
      // Note that we should *not* use our cookies in this scenario, since they may be referring to
      // the wrong user.
      $user       = isset($this->fb_params['user'])        ? $this->fb_params['user'] : null;
      $session_key = isset($this->fb_params['session_key']) ? $this->fb_params['session_key'] : null;
      $expires    = isset($this->fb_params['expires'])     ? $this->fb_params['expires'] : null;
      $this->set_user($user, $session_key, $expires);
    } else if (!empty($_COOKIE) && $cookies = $this->get_valid_fb_params($_COOKIE, null, $this->api_key)) {
      // use $api_key . '_' as a prefix for the cookies in case there are
      // multiple facebook clients on the same domain.
      $this->set_user($cookies['user'], $cookies['session_key']);
    } else if (isset($_GET['auth_token']) && $session = $this->do_get_session($_GET['auth_token'])) {
      $this->set_user($session['uid'], $session['session_key'], $session['expires']);
    } return !empty($this->fb_params);
  } public function do_get_session($auth_token) {
    try {
      return $this->api_client->auth_getSession($auth_token);
    } catch (FacebookRestClientException $e) {
      // API_EC_PARAM means we don't have a logged in user, otherwise who
      // knows what it means, so just throw it.
      if ($e->getCode() != FacebookAPIErrorCodes::API_EC_PARAM) {
        throw $e;
```

```
    }
  }
} public function redirect($url) {
  if ($this->in_fb_canvas()) {
    echo '<fb:redirect url="' . $url . '"/>';
  } else if (preg_match('/^https?:\/\/([^\/]*\.)?facebook\.com(:\d+)?/i', $url)) {
    // make sure facebook.com url's load in the full frame so that we don't
    // get a frame within a frame.
    echo "<script type=\"text/javascript\">\ntop.location.href = \"$url\";\n</script>";
  } else {
    header('Location: ' . $url);
  }
  exit;
} public function in_frame() {
  return isset($this->fb_params['in_canvas']) || isset($this->fb_params['in_iframe']);
}
public function in_fb_canvas() {
  return isset($this->fb_params['in_canvas']);
} public function get_loggedin_user() {
  return $this->user;
} public static function current_url() {
  return 'http://' . $_SERVER['HTTP_HOST'] . $_SERVER['REQUEST_URI'];
} public function require_login() {
  if ($user = $this->get_loggedin_user()) {
    return $user;
  }
  $this->redirect($this->get_login_url(self::current_url(), $this->in_frame()));
} public function require_install() {
  // this was renamed, keeping for compatibility's sake
  return $this->require_add();
} public function require_add() {
  if ($user = $this->get_loggedin_user()) {
```

```php
    if ($this->fb_params['added']) {
      return $user;
    }
  }
  $this->redirect($this->get_add_url(self::current_url()));
} public function require_frame() {
  if (!$this->in_frame()) {
    $this->redirect($this->get_login_url(self::current_url(), true));
  }
} public static function get_facebook_url($subdomain='www') {
  return 'http://' . $subdomain . '.facebook.com';
} public function get_install_url($next=null) {
  // this was renamed, keeping for compatibility's sake
  return $this->get_add_url($next);
} public function get_add_url($next=null) {
  return self::get_facebook_url().'/add.php?api_key='.$this->api_key .
    ($next ? '&next=' . urlencode($next) : '');
} public function get_login_url($next, $canvas) {
  return self::get_facebook_url().'/login.php?v=1.0&api_key=' . $this->api_key .
    ($next ? '&next=' . urlencode($next)  : '') .
    ($canvas ? '&canvas' : '');
} public static function generate_sig($params_array, $secret) {
  $str = '';

ksort($params_array);
  // Note: make sure that the signature parameter is not already included in
  //     $params_array.
  foreach ($params_array as $k=>$v) {
    $str .= "$k=$v";
  }
  $str .= $secret;

return md5($str);
}
```

```php
public function set_user($user, $session_key, $expires=null) {
  if (!$this->in_fb_canvas() && (!isset($_COOKIE[$this->api_key . '_user'])
                  || $_COOKIE[$this->api_key . '_user'] != $user)) {
    $cookies = array();
    $cookies['user'] = $user;
    $cookies['session_key'] = $session_key;
    $sig = self::generate_sig($cookies, $this->secret);
    foreach ($cookies as $name => $val) {
      setcookie($this->api_key . '_' . $name, $val, (int)$expires);
      $_COOKIE[$this->api_key . '_' . $name] = $val;
    }
    setcookie($this->api_key, $sig, (int)$expires);
    $_COOKIE[$this->api_key] = $sig;
  }
  $this->user = $user;
  $this->api_client->session_key = $session_key;
}

/**
 * Tries to undo the badness of magic quotes as best we can
 * @param   string  $val   Should come directly from $_GET, $_POST, etc.
 * @return  string   val without added slashes
 */
public static function no_magic_quotes($val) {
  if (get_magic_quotes_gpc()) {
    return stripslashes($val);
  } else {
    return $val;
  }
} public function get_valid_fb_params($params, $timeout=null, $namespace='fb_sig') {
  $prefix = $namespace . '_';
  $prefix_len = strlen($prefix);
  $fb_params = array();
  foreach ($params as $name => $val) {
    if (strpos($name, $prefix) === 0) {
      $fb_params[substr($name, $prefix_len)] = self::no_magic_quotes($val);
    }
  }
  if ($timeout && (!isset($fb_params['time']) || time() - $fb_params['time'] > $timeout)) {
    return array();
  }
  if (!isset($params[$namespace]) || !$this->verify_signature($fb_params,
```

```
   $params[$namespace])) {
         return array();
       }
       return $fb_params;
   } public function verify_signature($fb_params, $expected_sig) {
     return self::generate_sig($fb_params, $this->secret) == $expected_sig;
   }
 }

?>
``` facebook_desktop.php

```
<?php
//
// +----------------------------------------------------------------------+
// | Facebook Platform PHP5 client                                        |
// +----------------------------------------------------------------------+
// | Copyright (c) 2007 Facebook, Inc.                                    |
// | All rights reserved.                                                 |
// |                                                                      |
// | Redistribution and use in source and binary forms, with or without   |
// | modification, are permitted provided that the following conditions   |
// | are met:                                                             |
// |                                                                      |
// | 1. Redistributions of source code must retain the above copyright    |
// |    notice, this list of conditions and the following disclaimer.     |
// | 2. Redistributions in binary form must reproduce the above copyright |
// |    notice, this list of conditions and the following disclaimer in the |
// |    documentation and/or other materials provided with the distribution. |
// |                                                                      |
// | THIS SOFTWARE IS PROVIDED BY THE AUTHOR ``AS IS'' AND ANY EXPRESS OR |
// | IMPLIED WARRANTIES, INCLUDING, BUT NOT LIMITED TO, THE IMPLIED WARRANTIES |
// | OF MERCHANTABILITY AND FITNESS FOR A PARTICULAR PURPOSE ARE DISCLAIMED. |
// | IN NO EVENT SHALL THE AUTHOR BE LIABLE FOR ANY DIRECT, INDIRECT,     |
// | INCIDENTAL, SPECIAL, EXEMPLARY, OR CONSEQUENTIAL DAMAGES (INCLUDING, BUT |
// | NOT LIMITED TO, PROCUREMENT OF SUBSTITUTE GOODS OR SERVICES; LOSS OF USE, |
// | DATA, OR PROFITS; OR BUSINESS INTERRUPTION) HOWEVER CAUSED AND ON ANY |
```

```
// | THEORY OF LIABILITY, WHETHER IN CONTRACT, STRICT LIABILITY, OR
TORT    |
    // | (INCLUDING NEGLIGENCE OR OTHERWISE) ARISING IN ANY WAY OUT OF
THE USE OF |
    // | THIS SOFTWARE, EVEN IF ADVISED OF THE POSSIBILITY OF SUCH
DAMAGE.    |
    // +---------------------------------------------------------------------+
    // | For help with this library, contact developers-help@facebook.com    |
    // +---------------------------------------------------------------------+
    //

/**
 * This class extends and modifies the "Facebook" class to better
 * suit desktop apps.
 */
class FacebookDesktop extends Facebook {
  // the application secret, which differs from the session secret
  public $app_secret;
  public $verify_sig;

public function __construct($api_key, $secret) {
    $this->app_secret = $secret;
    $this->verify_sig = false;
    parent::__construct($api_key, $secret);
  } public function do_get_session($auth_token) {
    $this->api_client->secret = $this->app_secret;
    $session_info = parent::do_get_session($auth_token);
    if (isset($session_info['secret']) && $session_info['secret']) {
      // store the session secret
      $this->set_session_secret($session_info['secret']);
    }
    return $session_info;
  } public function set_session_secret($session_secret) {
    $this->secret = $session_secret;
    $this->api_client->secret = $session_secret;
  } public function require_login() {
    if ($this->get_loggedin_user()) {
      try {
        // try a session-based API call to ensure that we have the correct
        // session secret
```

```
    $user = $this->api_client->users_getLoggedInUser();

// now that we have a valid session secret, verify the signature
    $this->verify_sig = true;
    if ($this->validate_fb_params()) {
      return $user;
    } else {
      // validation failed
      return null;
    }
  } catch (FacebookRestClientException $ex) {
    if (isset($_GET['auth_token'])) {
      // if we have an auth_token, use it to establish a session
      $session_info = $this->do_get_session($_GET['auth_token']);
      if ($session_info) {
        return $session_info['uid'];
      }
    }
  }
}
// if we get here, we need to redirect the user to log in
$this->redirect($this->get_login_url(self::current_url(), $this->in_fb_canvas()));
} public function verify_signature($fb_params, $expected_sig) {
  // we don't want to verify the signature until we have a valid
  // session secret
  if ($this->verify_sig) {
    return parent::verify_signature($fb_params, $expected_sig);
  } else {
    return true;
  }
}
}
``` facebookapi_php5_restlib.php
```
<?php
//
// +------------------------------------------------------------------+
// | Facebook Platform PHP5 client                                    |
// +------------------------------------------------------------------+
// | Copyright (c) 2007 Facebook, Inc.                                |
// | All rights reserved.                                             |
// |                                                                  |
// | Redistribution and use in source and binary forms, with or without  |
// | modification, are permitted provided that the following conditions  |
```

```
//  | are met:                                                          |
//  |                                                                    |
//  | 1. Redistributions of source code must retain the above copyright  |
//  |    notice, this list of conditions and the following disclaimer.   |
//  | 2. Redistributions in binary form must reproduce the above copyright |
//  |    notice, this list of conditions and the following disclaimer in the |
//  |    documentation and/or other materials provided with the distribution. |
//  |                                                                    |
//  | THIS SOFTWARE IS PROVIDED BY THE AUTHOR ``AS IS'' AND ANY EXPRESS OR |
//  | IMPLIED WARRANTIES, INCLUDING, BUT NOT LIMITED TO, THE IMPLIED WARRANTIES |
//  | OF MERCHANTABILITY AND FITNESS FOR A PARTICULAR PURPOSE ARE DISCLAIMED. |
//  | IN NO EVENT SHALL THE AUTHOR BE LIABLE FOR ANY DIRECT, INDIRECT,   |
//  | INCIDENTAL, SPECIAL, EXEMPLARY, OR CONSEQUENTIAL DAMAGES (INCLUDING, BUT |
//  | NOT LIMITED TO, PROCUREMENT OF SUBSTITUTE GOODS OR SERVICES; LOSS OF USE, |
//  | DATA, OR PROFITS; OR BUSINESS INTERRUPTION) HOWEVER CAUSED AND ON ANY |
//  | THEORY OF LIABILITY, WHETHER IN CONTRACT, STRICT LIABILITY, OR TORT |
//  | (INCLUDING NEGLIGENCE OR OTHERWISE) ARISING IN ANY WAY OUT OF THE USE OF |
//  | THIS SOFTWARE, EVEN IF ADVISED OF THE POSSIBILITY OF SUCH DAMAGE.  |
// +--------------------------------------------------------------------+
//  | For help with this library, contact developers-help@facebook.com   |
// +--------------------------------------------------------------------+
// class FacebookRestClient {
  public $secret;
  public $session_key;
  public $api_key;
  public $friends_list; // to save making the friends.get api call, this will get prepopulated on canvas pages
  public $added;        // to save making the users.isAppAdded api call, this will get prepopulated on canvas pages /**
   * Create the client.
   * @param string $session_key if you haven't gotten a session key yet, leave
   *                this as null and then set it later by just
```

```
 *              directly accessing the $session_key member
 *              variable.
 */
public function __construct($api_key, $secret, $session_key=null) {
  $this->secret      = $secret;
  $this->session_key = $session_key;
  $this->api_key     = $api_key;
  $this->last_call_id = 0;
  $this->server_addr  = Facebook::get_facebook_url('api') . '/restserver.php';
  if ($GLOBALS['facebook_config']['debug']) {
    $this->cur_id = 0;
    ?>
<script type="text/javascript">
var types = ['params', 'xml', 'php', 'sxml'];
function toggleDisplay(id, type) {
  for each (var t in types) {
    if (t != type || document.getElementById(t + id).style.display == 'block') {
      document.getElementById(t + id).style.display = 'none';
    } else {
      document.getElementById(t + id).style.display = 'block';
    }
  }
  return false;
}
</script>
<?php
  }
}

/**
 * Returns the session information available after current user logs in.
 * @param string $auth_token the token returned by auth_createToken or
 *   passed back to your callback_url.
 * @return assoc array containing session_key, uid
 */
public function auth_getSession($auth_token) {
  $result = $this->call_method('facebook.auth.getSession',
array('auth_token'=>$auth_token));
  $this->session_key = $result['session_key'];
  if (isset($result['secret']) && $result['secret']) {
    // desktop apps have a special secret
    $this->secret = $result['secret'];
  }
  return $result;
}
```

```
/**
 * Returns events according to the filters specified.
 * @param int $uid Optional: User associated with events.
 *   A null parameter will default to the session user.
 * @param array $eids Optional: Filter by these event ids.
 *   A null parameter will get all events for the user.
 * @param int $start_time Optional: Filter with this UTC as lower bound.
 *   A null or zero parameter indicates no lower bound.
 * @param int $end_time Optional: Filter with this UTC as upper bound.
 *   A null or zero parameter indicates no upper bound.
 * @param string $rsvp_status Optional: Only show events where the given uid
 *   has this rsvp status. This only works if you have specified a value for
 *   $uid. Values are as in events.getMembers. Null indicates to ignore
 *   rsvp status when filtering.
 * @return array of events
 */
public function events_get($uid, $eids, $start_time, $end_time, $rsvp_status) {
  return $this->call_method('facebook.events.get',
    array(
    'uid' => $uid,
    'eids' => $eids,
    'start_time' => $start_time,
    'end_time' => $end_time,
    'rsvp_status' => $rsvp_status));
}

/**
 * Returns membership list data associated with an event
 * @param int $eid : event id
 * @return assoc array of four membership lists, with keys 'attending',
 *   'unsure', 'declined', and 'not_replied'
 */
public function events_getMembers($eid) {
  return $this->call_method('facebook.events.getMembers',
    array('eid' => $eid));
}

/**
 * Makes an FQL query. This is a generalized way of accessing all the data
 * in the API, as an alternative to most of the other method calls. More
 * info at http://developers.facebook.com/documentation.php?v=1.0&doc=fql
 * @param string $query the query to evaluate
 * @return generalized array representing the results
 */
public function fql_query($query) {
  return $this->call_method('facebook.fql.query',
```

```
    array('query' => $query));
} public function feed_publishStoryToUser($title, $body,
                    $image_1=null, $image_1_link=null,
                    $image_2=null, $image_2_link=null,
                    $image_3=null, $image_3_link=null,
                    $image_4=null, $image_4_link=null,
                    $priority=1) {
  return $this->call_method('facebook.feed.publishStoryToUser',
    array('title' => $title,
        'body' => $body,
        'image_1' => $image_1,
        'image_1_link' => $image_1_link,
        'image_2' => $image_2,
        'image_2_link' => $image_2_link,
        'image_3' => $image_3,
        'image_3_link' => $image_3_link,
        'image_4' => $image_4,
        'image_4_link' => $image_4_link,
        'priority' => $priority));
} public function feed_publishActionOfUser($title, $body,
                    $image_1=null, $image_1_link=null,
                    $image_2=null, $image_2_link=null,
                    $image_3=null, $image_3_link=null,
                    $image_4=null, $image_4_link=null,
                    $priority=1) {
  return $this->call_method('facebook.feed.publishActionOfUser',
    array('title' => $title,
        'body' => $body,
        'image_1' => $image_1,
        'image_1_link' => $image_1_link,
        'image_2' => $image_2,
        'image_2_link' => $image_2_link,
        'image_3' => $image_3,
        'image_3_link' => $image_3_link,
        'image_4' => $image_4,
        'image_4_link' => $image_4_link,
        'priority' => $priority));
}

/**
 * Returns whether or not pairs of users are friends.
 * Note that the Facebook friend relationship is symmetric.
```

```
* @param array $uids1: array of ids (id_1, id_2,...) of some length X
* @param array $uids2: array of ids (id_A, id_B,...) of SAME length X
* @return array of uid pairs with bool, true if pair are friends, e.g.
*   array( 0 => array('uid1' => id_1, 'uid2' => id_A, 'are_friends' => 1),
*          1 => array('uid1' => id_2, 'uid2' => id_B, 'are_friends' => 0)
*          ...)
*/
public function friends_areFriends($uids1, $uids2) {
  return $this->call_method('facebook.friends.areFriends',
      array('uids1'=>$uids1, 'uids2'=>$uids2));
}

/**
 * Returns the friends of the current session user.
 * @return array of friends
 */
public function friends_get() {
  if (isset($this->friends_list)) {
    return $this->friends_list;
  }
  return $this->call_method('facebook.friends.get', array());
}

/**
 * Returns the friends of the session user, who are also users
 * of the calling application.
 * @return array of friends
 */
public function friends_getAppUsers() {
  return $this->call_method('facebook.friends.getAppUsers', array());
}

/**
 * Returns groups according to the filters specified.
 * @param int $uid Optional: User associated with groups.
 *  A null parameter will default to the session user.
 * @param array $gids Optional: group ids to query.
 *  A null parameter will get all groups for the user.
 * @return array of groups
 */
public function groups_get($uid, $gids) {
  return $this->call_method('facebook.groups.get',
      array(
        'uid' => $uid,
        'gids' => $gids));
}
```

```
/**
 * Returns the membership list of a group
 * @param int $gid : Group id
 * @return assoc array of four membership lists, with keys
 * 'members', 'admins', 'officers', and 'not_replied'
 */
public function groups_getMembers($gid) {
  return $this->call_method('facebook.groups.getMembers',
    array('gid' => $gid));
}

/**
 * Returns the outstanding notifications for the session user.
 * @return assoc array of
 * notification count objects for 'messages', 'pokes' and 'shares',
 * a uid list of 'friend_requests', a gid list of 'group_invites',
 * and an eid list of 'event_invites'
 */
public function notifications_get() {
  return $this->call_method('facebook.notifications.get', array());
}

/**
 * Sends an email notification to the specified user.
 * @return string url which you should send the logged in user to to finalize the message.
 */
public function notifications_send($to_ids, $notification, $email='') {
  return $this->call_method('facebook.notifications.send',
            array('to_ids' => $to_ids, 'notification' => $notification, 'email' => $email));
}

/**
 * Sends a request to the specified user (e.g. "you have 1 event invitation")
 * @param array $to_ids   user ids to receive the request (must be friends with sender, capped at 10)
 * @param string $type    type of request, e.g. "event" (as in "You have an event invitation.")
 * @param string $content fbml content of the request. really stripped down fbml - just
 *               text/names/links. also, use the special tag <fb:req-choice url="" label="" />
 *               to specify the buttons to be included.
 * @param string $image   url of an image to show beside the request
 * @param bool   $invite  whether to call it an "invitation" or a "request"
```

```
 * @return string url which you should send the logged in user to to finalize the
message.
 */
public function notifications_sendRequest($to_ids, $type, $content, $image, $invite) {
    return $this->call_method('facebook.notifications.sendRequest',
                array('to_ids' => $to_ids, 'type' => $type, 'content' => $content,
                    'image' => $image, 'invite' => $invite));
}

/**
 * Returns photos according to the filters specified.
 * @param int $subj_id Optional: Filter by uid of user tagged in the photos.
 * @param int $aid Optional: Filter by an album, as returned by
 *   photos_getAlbums.
 * @param array $pids Optional: Restrict to a list of pids
 * Note that at least one of these parameters needs to be specified, or an
 * error is returned.
 * @return array of photo objects.
 */
public function photos_get($subj_id, $aid, $pids) {
    return $this->call_method('facebook.photos.get',
        array('subj_id' => $subj_id, 'aid' => $aid, 'pids' => $pids));
}

/**
 * Returns the albums created by the given user.
 * @param int $uid Optional: the uid of the user whose albums you want.
 *   A null value will return the albums of the session user.
 * @param array $aids Optional: a list of aids to restrict the query.
 * Note that at least one of the (uid, aids) parameters must be specified.
 * @returns an array of album objects.
 */
public function photos_getAlbums($uid, $aids) {
    return $this->call_method('facebook.photos.getAlbums',
        array('uid' => $uid,
            'aids' => $aids));
}

/**
 * Returns the tags on all photos specified.
 * @param string $pids : a list of pids to query
 * @return array of photo tag objects, with include pid, subject uid,
 * and two floating-point numbers (xcoord, ycoord) for tag pixel location
 */
public function photos_getTags($pids) {
    return $this->call_method('facebook.photos.getTags',
```

```
        array('pids' => $pids));
    }

/**
     * Returns the requested info fields for the requested set of users
     * @param array $uids an array of user ids
     * @param array $fields an array of strings describing the info fields desired
     * @return array of users
     */
    public function users_getInfo($uids, $fields) {
        return $this->call_method('facebook.users.getInfo', array('uids' => $uids, 'fields' => $fields));
    }

/**
     * Returns the user corresponding to the current session object.
     * @return integer uid
     */
    public function users_getLoggedInUser(){
        return $this->call_method('facebook.users.getLoggedInUser', array());
    }

/**
     * Returns whether or not the user corresponding to the current session object has the app installed
     * @return boolean
     */
    public function users_isAppAdded() {
      if (isset($this->added)) {
        return $this->added;
      }
      return $this->call_method('facebook.users.isAppAdded', array());
    }

/**
     * Sets the FBML for the profile of the user attached to this session
     * @param  string   $markup    The FBML that describes the profile presence of this app for the user
     * @return array    A list of strings describing any compile errors for the submitted FBML
     */
    public function profile_setFBML($markup, $uid = null) {
        return $this->call_method('facebook.profile.setFBML', array('markup' => $markup, 'uid' => $uid));
    }
```

```php
public function profile_getFBML($uid) {
  return $this->call_method('facebook.profile.getFBML', array('uid' => $uid));
} public function fbml_refreshImgSrc($url) {
  return $this->call_method('facebook.fbml.refreshImgSrc', array('url' => $url));
} public function fbml_refreshRefUrl($url) {
  return $this->call_method('facebook.fbml.refreshRefUrl', array('url' => $url));
} public function fbml_setRefHandle($handle, $fbml) {
  return $this->call_method('facebook.fbml.setRefHandle', array('handle' => $handle,
'fbml' => $fbml));
}

/* UTILITY FUNCTIONS */ public function call_method($method, $params) {
  $xml = $this->post_request($method, $params);
  $sxml = simplexml_load_string($xml);
  $result = self::convert_simplexml_to_array($sxml);
  if ($GLOBALS['facebook_config']['debug']) {
  // output the raw xml and its corresponding php object, for debugging:
    print '<div style="margin: 10px 30px; padding: 5px; border: 2px solid black; background: gray; color: white; font-size: 12px; font-weight: bold;">';
    $this->cur_id++;
    print $this->cur_id . ': Called ' . $method . ', show '.
          '<a href=# onclick="return toggleDisplay(' . $this->cur_id . ', \'params\');">Params</a> | '.
          '<a href=# onclick="return toggleDisplay(' . $this->cur_id . ', \'xml\');">XML</a> | '.
          '<a href=# onclick="return toggleDisplay(' . $this->cur_id . ', \'sxml\');">SXML</a> | '.
          '<a href=# onclick="return toggleDisplay(' . $this->cur_id . ', \'php\');">PHP</a>';
    print '<pre id="params'.$this->cur_id.'" style="display: none; overflow: auto;">'.print_r($params, true).'</pre>';
    print '<pre id="xml'.$this->cur_id.'" style="display: none; overflow: auto;">'.htmlspecialchars($xml).'</pre>';
    print '<pre id="php'.$this->cur_id.'" style="display: none; overflow: auto;">'.print_r($result, true).'</pre>';
    print '<pre id="sxml'.$this->cur_id.'" style="display: none; overflow: auto;">'.print_r($sxml, true).'</pre>';
    print '</div>';
```

```
    }
    if (is_array($result) && isset($result['error_code'])) {
      throw new FacebookRestClientException($result['error_msg'], $result['error_code']);
    }
    return $result;
  } public function post_request($method, $params) {
    $params['method'] = $method;
    $params['session_key'] = $this->session_key;
    $params['api_key'] = $this->api_key;
    $params['call_id'] = microtime(true);
    if ($params['call_id'] <= $this->last_call_id) {
      $params['call_id'] = $this->last_call_id + 0.001;
    }
    $this->last_call_id = $params['call_id'];
    if (!isset($params['v'])) {
      $params['v'] = '1.0';
    }
    $post_params = array();
    foreach ($params as $key => &$val) {
      if (is_array($val)) $val = implode(',', $val);
      $post_params[] = $key.'='.urlencode($val);
    }
    $secret = $this->secret;
    $post_params[] = 'sig='.Facebook::generate_sig($params, $secret);
    $post_string = implode('&', $post_params);

if (function_exists('curl_init')) {
      // Use CURL if installed...
      $ch = curl_init();
      curl_setopt($ch, CURLOPT_URL, $this->server_addr);
      curl_setopt($ch, CURLOPT_POSTFIELDS, $post_string);
      curl_setopt($ch, CURLOPT_RETURNTRANSFER, true);
      curl_setopt($ch, CURLOPT_USERAGENT, 'Facebook API PHP5 Client 1.1 (curl) ' . phpversion());
      $result = curl_exec($ch);
      curl_close($ch);
    } else {
      // Non-CURL based version...
      $context =
        array('http' =>
          array('method' => 'POST',
                'header' => 'Content-type: application/x-www-form-urlencoded'."\r\n".
                            'User-Agent: Facebook API PHP5 Client 1.1 (non-curl) '.phpversion()."\r\n".
```

```php
                    'Content-length: ' . strlen($post_string),
            'content' => $post_string));
    $contextid=stream_context_create($context);
    $sock=fopen($this->server_addr, 'r', false, $contextid);
    if ($sock) {
      $result='';
      while (!feof($sock))
        $result.=fgets($sock, 4096);

fclose($sock);
    }
  }
  return $result;
} public static function convert_simplexml_to_array($sxml) {
  $arr = array();
  if ($sxml) {
    foreach ($sxml as $k => $v) {
      if ($sxml['list']) {
        $arr[] = self::convert_simplexml_to_array($v);
      } else {
        $arr[$k] = self::convert_simplexml_to_array($v);
      }
    }
  }
  if (sizeof($arr) > 0) {
    return $arr;
  } else {
    return (string)$sxml;
  }
 }
} class FacebookRestClientException extends Exception {
}

// Supporting methods and values------

/**
 * Error codes and descriptions for the Facebook API.
 */ class FacebookAPIErrorCodes { const API_EC_SUCCESS = 0;
```

```
/*
 * GENERAL ERRORS
 */
const API_EC_UNKNOWN = 1;
const API_EC_SERVICE = 2;
const API_EC_METHOD = 3;
const API_EC_TOO_MANY_CALLS = 4;
const API_EC_BAD_IP = 5;

/*
 * PARAMETER ERRORS
 */
const API_EC_PARAM = 100;
const API_EC_PARAM_API_KEY = 101;
const API_EC_PARAM_SESSION_KEY = 102;
const API_EC_PARAM_CALL_ID = 103;
const API_EC_PARAM_SIGNATURE = 104;
const API_EC_PARAM_USER_ID = 110;
const API_EC_PARAM_USER_FIELD = 111;
const API_EC_PARAM_SOCIAL_FIELD = 112;
const API_EC_PARAM_ALBUM_ID = 120;

/*
 * USER PERMISSIONS ERRORS
 */
const API_EC_PERMISSION = 200;
const API_EC_PERMISSION_USER = 210;
const API_EC_PERMISSION_ALBUM = 220;
const API_EC_PERMISSION_PHOTO = 221;

const FQL_EC_PARSER = 601;
const FQL_EC_UNKNOWN_FIELD = 602;
const FQL_EC_UNKNOWN_TABLE = 603;
const FQL_EC_NOT_INDEXABLE = 604;

public static $api_error_descriptions = array(
    API_EC_SUCCESS          => 'Success',
    API_EC_UNKNOWN          => 'An unknown error occurred',
    API_EC_SERVICE          => 'Service temporarily unavailable',
    API_EC_METHOD           => 'Unknown method',
    API_EC_TOO_MANY_CALLS   => 'Application request limit reached',
    API_EC_BAD_IP           => 'Unauthorized source IP address',
    API_EC_PARAM            => 'Invalid parameter',
    API_EC_PARAM_API_KEY    => 'Invalid API key',
    API_EC_PARAM_SESSION_KEY => 'Session key invalid or no longer valid',
```

```
    API_EC_PARAM_CALL_ID    => 'Call_id must be greater than previous',
    API_EC_PARAM_SIGNATURE  => 'Incorrect signature',
    API_EC_PARAM_USER_ID    => 'Invalid user id',
    API_EC_PARAM_USER_FIELD => 'Invalid user info field',
    API_EC_PARAM_SOCIAL_FIELD => 'Invalid user field',
    API_EC_PARAM_ALBUM_ID   => 'Invalid album id',
    API_EC_PERMISSION       => 'Permissions error',
    API_EC_PERMISSION_USER  => 'User not visible',
    API_EC_PERMISSION_ALBUM => 'Album not visible',
    API_EC_PERMISSION_PHOTO => 'Photo not visible',
    FQL_EC_PARSER           => 'FQL: Parser Error',
    FQL_EC_UNKNOWN_FIELD    => 'FQL: Unknown Field',
    FQL_EC_UNKNOWN_TABLE    => 'FQL: Unknown Table',
    FQL_EC_NOT_INDEXABLE    => 'FQL: Statement not indexable',
    FQL_EC_UNKNOWN_FUNCTION => 'FQL: Attempted to call unknown function',
    FQL_EC_INVALID_PARAM    => 'FQL: Invalid parameter passed in',
);
}

$profile_field_array = array(
    "about_me",
    "activities",
    "affiliations",
    "birthday",
    "books",
    "current_location",
    "education_history",
    "first_name",
    "hometown_location",
    "hs_info",
    "interests",
    "is_app_user",
    "last_name",
    "meeting_for",
    "meeting_sex",
    "movies",
    "music",
    "name",
    "notes_count",
    "pic",
    "pic_big",
    "pic_small",
    "political",
    "profile_update_time",
    "quotes",
    "relationship_status",
```

```
    "religion",
    "sex",
    "significant_other_id",
    "status",
    "timezone",
    "tv",
    "wall_count",
    "work_history");
?>
``` rate_date_tbl
-- phpMyAdmin SQL Dump
-- version 2.10.0.2
-- http://www.phpmyadmin.net
--
-- Host: localhost
-- Generation Time: Nov 30, 2007 at 01:05 PM
-- Server version: 5.0.37
-- PHP Version: 5.2.1

SET SQL_MODE="NO_AUTO_VALUE_ON_ZERO";

--
-- Database: `rate_date_tbl`
--

-- --------------------------------------------------------

--
-- Table structure for table `dating_tbl`
--

CREATE TABLE `dating_tbl` (
  `id` bigint(100) NOT NULL auto_increment,
  `sender_id` varchar(100) collate latin1_general_ci NOT NULL,
  `receiver_id` varchar(100) collate latin1_general_ci NOT NULL,
  `sender_fname` varchar(100) collate latin1_general_ci NOT NULL,
  `sender_lname` varchar(100) collate latin1_general_ci NOT NULL,
  `receiver_fname` varchar(100) collate latin1_general_ci NOT NULL,
  `receiver_lname` varchar(100) collate latin1_general_ci NOT NULL,
  `sender_rate_no` varchar(100) collate latin1_general_ci NOT NULL,
  `send_date` date NOT NULL,
  `image_source` varchar(100) collate latin1_general_ci NOT NULL,
  `image_source1` varchar(150) collate latin1_general_ci NOT NULL,
  `gender_preference` varchar(100) collate latin1_general_ci NOT NULL,
  `sexual_orientation` varchar(100) collate latin1_general_ci NOT NULL,

```
  `contact_type` varchar(100) collate latin1_general_ci NOT NULL,
  PRIMARY KEY (`id`)
) ENGINE=MyISAM DEFAULT CHARSET=latin1 COLLATE=latin1_general_ci AUTO_INCREMENT=20 ;
```

--
-- Dumping data for table `dating_tbl`
--

```
INSERT INTO `dating_tbl` VALUES (16, '597904334', '544288788', 'Veena', 'Padale', 'Shyam', 'Ahire', '10', '2007-11-28',
'http://profile.ak.facebook.com/profile6/906/121/n544288788_9376.jpg',
'http://profile.ak.facebook.com/profile5/416/56/n597904334_9940.jpg', 'female', 'staright', 'email');
INSERT INTO `dating_tbl` VALUES (11, '597904334', '534994810', 'Veena', 'Padale', 'Ashish', 'Chavan', '10', '2007-11-28',
'http://profile.ak.facebook.com/profile5/1278/108/n534994810_7446.jpg',
'http://profile.ak.facebook.com/profile5/416/56/n597904334_9940.jpg', 'female', 'staright', 'email');
INSERT INTO `dating_tbl` VALUES (17, '534994810', '597904334', 'Ashish', 'Chavan', 'Veena', 'Padale', '7', '2007-11-28',
'http://profile.ak.facebook.com/profile5/416/56/n597904334_9940.jpg',
'http://profile.ak.facebook.com/profile5/1278/108/n534994810_7446.jpg', 'male', 'staright', 'email');
INSERT INTO `dating_tbl` VALUES (18, '534994810', '652507370', 'Ashish', 'Chavan', 'Cherian', 'Sabby', '7', '2007-11-28',
'http://profile.ak.facebook.com/profile5/517/70/n652507370_3918.jpg',
'http://profile.ak.facebook.com/profile5/1278/108/n534994810_7446.jpg', 'male', 'staright', 'email');
```

-- ---------------------------------------------------------

--
-- Table structure for table `set_preference_tbl`
--

```
CREATE TABLE `set_preference_tbl` (
  `id` int(100) NOT NULL auto_increment,
  `sender_id` varchar(100) collate latin1_general_ci NOT NULL,
  `sender_fname` varchar(100) collate latin1_general_ci NOT NULL,
  `sender_lname` varchar(100) collate latin1_general_ci NOT NULL,
  `gender_preference` varchar(100) collate latin1_general_ci NOT NULL,
  `sexual_orientation` varchar(100) collate latin1_general_ci NOT NULL,
  `contact_type` varchar(100) collate latin1_general_ci NOT NULL,
  PRIMARY KEY (`id`)
) ENGINE=MyISAM DEFAULT CHARSET=latin1 COLLATE=latin1_general_ci
```

AUTO_INCREMENT=10 ;

--
-- Dumping data for table `set_preference_tbl`
--

INSERT INTO `set_preference_tbl` VALUES (9, '534994810', 'Ashish', 'Chavan', 'male', 'staright', 'email');  .

We claim:

1. A method of facilitating contact between mutually interested entities, comprising:
providing on an electronic communications system a graphical interface for a user to input a rating of its level of interest in one or more respects in at least one other user from a pre-existing list of contacts,
not displaying the user's input ratings to other users,
and electronically notifying a pair of users when each user's input rating for the other has exceeded a threshold level.

2. The method of claim 1, wherein the providing a graphical interface further comprises modifying an existing graphical interface of a social networking site, instant messaging software, cell phone, or PDA.

3. The method facilitating contact between mutually interested entities using a processor, comprising:
providing on an electronic communications system a graphical interface for a user input a rating of its level of interest in one or more respects in at least one other user from a pre-existing list of contacts,
not displaying the user' input ratings to other users, and
electronically notifying a pair of users when each user' input rating for the other has exceeded a threshold level.

4. The method of claim 3, wherein user settings or preferences can be set and adjusted for all the modified graphical interfaces from a central location.

5. The method of claim 3, wherein user settings or preferences can be set and adjusted for all the modified graphical interfaces from any one of the modified graphical interfaces.

6. The method of claim 3, further comprising providing a single graphical interface outside of the social networking sites, instant messaging software, cell phones, or PDAs with modified graphical interfaces that the user can use to rate contacts from at least two of the two or more social networking sites, instant messaging software, cell phones, or PDAs.

7. The method of claim 6, wherein the single graphical interface outside of the social networking sites, instant messaging software, cell phones, or PDAs with modified graphical interfaces is a downloadable program or website.

8. The method of claim 7, further comprising maintaining a central database of contact, rating, and preference information with the downloadable program or website.

9. The method of claim 2, further comprising providing a graphical interface that allows the user to invite contacts who are not yet users of a social networking site, instant messaging software, cell phone, or PDA with the modified graphical interface to join the social networking site, instant messaging software, cell phone, or PDA with the modified graphical interface.

10. The method of claim 2, further comprising storing rating information on a social networking site or in an instant messaging software or instant messaging software server.

11. The method of claim 2, wherein the providing a graphical interface further comprises modifying an existing graphical interface of a cell phone or PDA and the rating information is stored on an online server.

12. The method of claim 1, wherein the pre-existing list of contacts is from a social networking site, instant messaging software, cell phone, or PDA, and the graphical interface is provided on a separate website.

13. The method of claim 1, wherein the notifying a pair of users further comprises sending an email, instant message, or cell phone text message.

14. The method of claim 13, further comprising providing a graphical interface allowing the user to set the way in which it is notified.

15. The method of claim 1, wherein the notifying a pair of users further comprises sending the pair of users suggestions for date or meeting locations, events to go to, general relationship or dating advice, or context-specific relationship advice.

16. The method of claim 15, wherein the suggestions or advice further comprise advertisements.

17. The method of claim 15, wherein the context-specific advice varies depending on the relative ratings of each of the pair of users for the other.

18. The method of claim 15, wherein the context-specific advice includes suggestions of how to best contact and establish a baseline relationship with the other user of the pair of users.

19. The method of claim 1, further comprising providing a graphical interface for users to set a preference for one party to initiate and modifying the notifying a pair of users based on the preference of the pair of users.

20. The method of claim 19, wherein the modifying the notifying a pair of users based on the preference of the pair of users comprises notifying one user of the pair before the other when both prefer one party to initiate.

21. The method of claim 19, wherein the modifying the notifying a pair of users based on the preference of the pair of users comprises notifying at least one user of the pair of the preference for one party to initiate of the other.

22. The method of claim 1, further comprising suggesting to a first user other users that first user may be interested in based on a comparison of the first user's ratings with other users'.

23. The method of claim 22, wherein the other users suggested are not on the first user's pre-existing list of contacts.

24. The method of claim 23, wherein the other users suggested are users rated highly by users other than the first user who rate the users on the first user's pre-existing list of contacts similarly to the first user.

25. The method of claim 22, wherein the suggesting is only done when the user has opted to receive such suggestions.

26. The method of claim 1, further comprising providing a graphical interface to allow the user to match-make by suggesting potential matches to other users they know.

27. The method of claim 26, further comprising allowing the user to choose not to receive suggested potential matches.

28. The method of claim 15, further comprising allowing the user to choose whether to receive suggested potential matches depending on characteristics of the suggested potential match.

29. The method of claim 15, further comprising notifying one member of a suggested potential match if the other party has opted not to receive the suggested potential match.

30. The method of claim 29, further comprising providing an option for the other party to allow the notifying one party of a suggested potential match to include informing the one party of the reason the other party has opted not to receive the suggested potential match.

31. The method of claim 1, wherein one of the one or more respects is a non-romantic respect.

32. The method of claim 16, wherein the providing a graphical interface for a user to rate its level of interest in one or more respects in at least one other user further comprises providing different access points and contact lists for the user to rate its level of interest in romantic and non-romantic respects.

33. The method of claim 16, wherein a single access point and contact list are used for rating interest in romantic and non-romantic respects.

34. The method of claim 1, further comprising providing a graphical interface that allows a user to import contacts from an instant messaging software, social networking site, PDA, or cell phone, and displaying a comprehensive list of contacts for the user to rate.

35. The method of claim 1, wherein the notifying a pair of users when each user's rating for the other has exceeded a threshold level further comprises checking each contact the user has rated above the threshold level to see if that contact has also rated the user above that threshold level whenever a user rates a new contact or changes an existing rating.

36. The method of claim 1, wherein the notifying a pair of users further comprises sending a single notification as soon as the pair's ratings exceed the threshold level, and wherein another notification is not sent unless the ratings change such that one of the pair's ratings does not exceed the threshold level, and subsequently the pair's ratings change again such that each rating exceeds the threshold level.

37. The method of claim 1, further comprising providing an indicator that indicates for the user each contact on a pre-existing list of contacts for which that contact's rating of the user and the user's rating of that contact each exceed the threshold level.

38. The method of claim 1, further comprising providing a graphical interface that allows the user to set a number of preferences regarding how contact lists and ratings are displayed and accessed.

39. The method of claim 1, wherein the providing a graphical interface, not displaying a user's ratings to other users, and notifying a pair of users are performed using an existing website and software infrastructure, wherein additional storage or servers or maintenance of a separate website are not necessary.

40. The method of claim 1, further comprising providing a graphical interface allowing the threshold level to be modified by the user.

41. The method of claim 40, wherein the threshold level can be modified upwards but not downwards.

42. The method of claim 1, further comprising providing a graphical interface allowing a desired threshold level to be set by the user and setting the threshold level to the highest desired threshold level of the pair of users.

43. The method of claim 1, further comprising providing an option to the user to receive relationship advice when the user rates another user highly but the other user does not rate the user above the threshold level, when the user rates another user more highly than the other user rates the user and the other user does rate the user above the threshold level, or whenever a pair of users including the user is notified.

44. The method of claim 1, further comprising informing the user when another user who the user has rated does not have a rating for the user.

45. The method of claim 44, further comprising providing an option to the user to allow another user to be informed when the user does not have a rating for the other user, and otherwise not informing the other user.

46. The method of claim 1, further comprising
reading the pre-existing list of contacts,
displaying the list,
checking to see if a new contact was added to the contact list, if so providing a graphical notice for the user to rate the new contact,
sorting the list according to rating,
displaying the sorted list,
scanning the list for ratings exceeding the threshold level, and
checking to see if contacts rated above the threshold level have rated the user above the threshold level.

47. A method of facilitating contact between mutually interested entities, comprising:
providing a graphical interface on a communications system comprising a processor, a user input device, a display device, and a memory device, said memory device configurable to store executable instructions for causing said processor to perform upon execution the method or to communicate upon execution with a remote server for performing the method, for a user to input a rating of the user's level of interest in one or more respects in at least one other user from a pre-existing list of contacts,
not displaying the user's input ratings to other users,
and electronically notifying a pair of users via the graphical interface when each user's input rating for the other has exceeded a threshold level.

48. A computer-readable non-transitory physical storage medium having stored thereon machine-executable code for electronically facilitating contact between mutually interested entities, said machine-executable code configured to be processed by a microprocessor, said machine executable code comprising:
first machine executable code which when executed by said microprocessor causes the microprocessor to present on a display device a graphical user interface (GUI) for a user to input a rating of the user's level of interest in one or more respects in at least one other user from a pre-existing list of contacts,
second machine executable code which when executed by said microprocessor causes the microprocessor to accept the user's level of interest rating via the GUI while not displaying the user's rating to other users, and
third machine executable code which when executed by said microprocessor causes the microprocessor to electronically notify a pair of users via the GUI when each user's rating for the other has exceeded a threshold level.

* * * * *